(12) United States Patent
Gindele et al.

(10) Patent No.: US 7,058,234 B2
(45) Date of Patent: Jun. 6, 2006

(54) ENHANCING THE TONAL, SPATIAL, AND COLOR CHARACTERISTICS OF DIGITAL IMAGES USING EXPANSIVE AND COMPRESSIVE TONE SCALE FUNCTIONS

(75) Inventors: Edward B. Gindele, Rochester, NY (US); Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 762 days.

(21) Appl. No.: 10/280,369

(22) Filed: Oct. 25, 2002

(65) Prior Publication Data

US 2004/0081369 A1    Apr. 29, 2004

(51) Int. Cl.
*G06K 9/40* (2006.01)

(52) U.S. Cl. .................. 382/274; 382/167; 382/275; 358/3.27; 358/518

(58) Field of Classification Search ................ 382/165, 382/166, 167, 224, 260, 274, 275; 358/3.26, 358/3.27, 518, 520
See application file for complete search history.

(56) References Cited

U.S. PATENT DOCUMENTS 6,167,165 A    12/2000    Gallagher et al.
6,285,798 B1    9/2001    Lee
6,317,521 B1    11/2001    Gallagher et al.
6,408,103 B1    6/2002    Gallagher et al.

FOREIGN PATENT DOCUMENTS

| EP | 0 377 386 A | 7/1990 |
|---|---|---|
| EP | 1 005 223 A | 5/2000 |
| EP | 1 017 229 A | 7/2000 |
| EP | 1 017 241 A | 7/2000 |
| EP | 1 024 454 A | 8/2000 |

*Primary Examiner*—Samir Ahmed
*Assistant Examiner*—Yosef Kassa
(74) *Attorney, Agent, or Firm*—Raymond L. Owens

(57) ABSTRACT

A method of enhancing the tonal and spatial characteristics of a digital image includes receiving a source digital image wherein the source digital image is in a luminance-chrominance representation having a luminance digital image channel and at least two chrominance digital image channels; generating a tone scale function that can be used to enhance the tonal characteristics of the source digital image; and classifying the tone scale function into one of two or more categories wherein the classification categories include expansive and compressive. The method further includes using the tone scale function, a spatial filter, and the luminance digital image channel to generate an enhanced luminance digital image channel when the tone scale function has been classified as compressive, and using the tone scale function and the luminance digital image channel to generate an enhanced luminance digital image channel when the tone scale function has been classified as expansive.

47 Claims, 16 Drawing Sheets

ENHANCING THE TONAL, SPATIAL, AND COLOR CHARACTERISTICS OF DIGITAL IMAGES USING EXPANSIVE AND COMPRESSIVE TONE SCALE FUNCTIONS

CROSS REFERENCE TO RELATED APPLICATIONS

Reference is made to commonly-assigned U.S. patent application Ser. No. 10/178,260, filed Jun. 24, 2002, entitled "Enhancing the Tonal Characteristics of Digital Images" by Edward B. Gindele; U.S. patent application Ser. No. 10/246,856 filed Sep. 19, 2002, entitled "Enhancing the Tonal Characteristics of Digital Images Using Inflection Points in a Tone Scale Function" by Edward B. Gindele; U.S. patent application Ser. No. 10/263,110 filed Oct. 2, 2002, entitled "Enhancing the Tonal Characteristics of Digital Images Using Expansive and Compressive Tone Scale Functions" by Edward B. Gindele et al; U.S. patent application Ser. No. 10/263,113 filed Oct. 2, 2002, entitled "Enhancing the Tonal and Color Characteristics of Digital Images Using Expansive and Compressive Tone Scale Functions" by Edward B. Gindele et al; and U.S. patent application Ser. No. 10/280,372 filed concurrently herewith, entitled "Enhancing the Tonal and Spatial Characteristics of Digital Images Using Selective Spatial Filters" by Edward B. Gindele, the disclosures of which are incorporated herein by reference.

FIELD OF THE INVENTION

This invention relates to digital image processing and in particular to processing a digital image to enhance it's tonal, spatial, and color characteristics.

BACKGROUND OF THE INVENTION

Many digital imaging systems enhance the contrast and lightness characteristics of digital images through the application of a tone scale curve. For a generalized tone scale curve $f(\ )$, the input pixel value x is transformed to an output pixel value $f(x)$. The shape of the tone scale curve determines the visual effect imparted to the processed digital image. Some tone scale curves applied to digital image are independent of the pixel values in the digital image to be processed. Such image independent tone scale curves are useful for establishing a photographic look to the processed digital images. While image independent tone scale curves can be used to enhance many digital images, digital images that are either too high or low in contrast can benefit from the application of a tone scale curve that is responsive to the distribution of pixel values in the digital image to be processed. For image dependent tone scale curves, the mathematical formula used to generate the function $f(x)$ determines the degree and nature of the image enhancement.

When a compressive tone scale function, i.e. the tone scale function designed to reduce the numerical range of pixel values, is applied directly to image pixel data, the spatial detail in the image can be diminished. In addition, if the compressive tone scale function is applied directly to a color digital image that is in a red-green-blue representation, the tone scale function can reduce the colorfulness (saturation) characteristics of the processed digital image. In general, better results can be achieved if the compressive tone scale function is applied directly to the luminance signal of a luminance-chrominance image representation. This procedure leaves the chrominance signals unchanged but can lead to processed images that have diminished spatial detail.

In the method disclosed by Gallagher et al. in U.S. Pat. No. 6,167,165, the spatial detail of the processed image can be mostly restored. In this method, a tone scale function is applied directly to the luminance signal and the spatial frequency detail of the tone scale modified luminance signal is adjusted inversely proportional to the slope of the applied tone scale function. The resultant processed digital images have more spatial detail and appear more natural.

A spatial filter can be used to apply a tone scale function to a digital image in such a manner that the image spatial detail will be relatively unaffected. This is particularly useful for compressive tone scale functions designed to reduce the image dynamic range. Such spatial filtering methods have been disclosed in U.S. Pat. Nos. 6,317,521 and 6,285,798. When applying compressive tone scale functions to the luminance signal with a spatial filter, the color characteristics of the processed digital images look more natural even though the chrominance signals are not modified.

Some of the color problems incurred with the application of tone scale functions to luminance-chrominance representation digital images can be solved using the method disclosed by Gallagher et al. in U.S. Pat. No. 6,408,103. In this method the chrominance signals are modified as a function of the slope of the applied tone scale function. Modifying the chrominance signals in this manner tends to alleviate the unnatural color effects that would otherwise result.

Some images naturally have a low numerical range to the pixel values and can be enhanced by applying an expansive tone scale function designed to increase the numerical range of pixel values. Simple histogram stretching methods are well known in the art. Typically a histogram is calculated from the image pixel values and the minimum and maximum pixel values are obtained. A tone scale function is constructed using a linear transform equation that expands the pixel values to achieve a predetermined goal. For example, the minimum pixel value is mapped to a lower pixel value while the maximum pixel value is mapped to a higher pixel value. Applying an expansive tone scale function to image pixel data when in a red-green-blue representation has the effect of increasing image contrast, spatial detail, and color saturation. In general, the increase in contrast and spatial detail is viewed as an improvement in image quality. However, the increase in color saturation can lead to super-saturated color that can appear unnaturally colorful. Applying an expansive tone scale function to the luminance signal of a luminance-chrominance representation has the effect of increasing image contrast and spatial detail, but decreasing the apparent color saturation even though the chrominance signals are mathematically unaltered.

The above mentioned methods are individually designed to either avoid or remedy specific problems with image spatial detail and color characteristics when for applying tone scale functions to digital images. However, these methods have been designed to work primarily for compressive tone scale functions.

SUMMARY OF THE INVENTION

It is an object of the present invention to classify a tone scale function that can be used to enhance the tonal characteristics of a digital image into one of a plurality of categories that includes compressive and expansive, such that when the tone scale function is applied to the digital image the spatial and color characteristics are also enhanced in response to the classification category.

This object is achieved by a method of enhancing the tonal and spatial characteristics of a digital image, comprising the steps of:

a) receiving a source digital image including a plurality of pixels wherein the source digital image is in a luminance-chrominance representation having a luminance digital image channel and at least two chrominance digital image channels;

b) generating a tone scale function that can be used to enhance the tonal characteristics of the source digital image;

c) classifying the tone scale function into one of two or more categories wherein the classification categories include expansive and compressive;

d) using the tone scale function, a spatial filter, and the luminance digital image channel to generate an enhanced luminance digital image channel when the tone scale function has been classified as compressive; and e) using the tone scale function and the luminance digital image channel to generate an enhanced luminance digital image channel when the tone scale function has been classified as expansive.

It is a feature of the present invention that by using a spatial filter when the tone scale function has been classified as expansive, the spatial detail and color characteristics of the processed digital image are enhanced while maintaining the spatial detail and color characteristics of the processed digital image when the tone scale function has been classified as compressive. It is another feature of the present invention that the tone scale function can have three classification categories: compressive; expansive; and mixed expansive-compressive. When any of the categories are determined, the present invention provides for improved spatial detail and color characteristics in the processed digital image.

DETAILED DESCRIPTION OF THE INVENTION

In the following description, a preferred embodiment of the present invention will be described as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein, may be selected from such systems, algorithms, components, and elements thereof known in the art. Given the description as set forth in the following specification, all software implementation thereof as a computer program is conventional and within the ordinary skill in such arts.

Still further, as used herein, the computer program may be stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image is comprised of one or more digital image channels. Each digital image channel is comprised of a two-dimensional array of pixels. Each pixel value relates to the amount of light received by the imaging capture device corresponding to the geometrical domain of the pixel. For color imaging applications, a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications.

Although the present invention describes a digital image channel as a two-dimensional array of pixels values arranged by rows and columns, those skilled in the art will recognize that the present invention can be applied to mosaic (non-rectilinear) arrays with equal effect.

Figure 1:
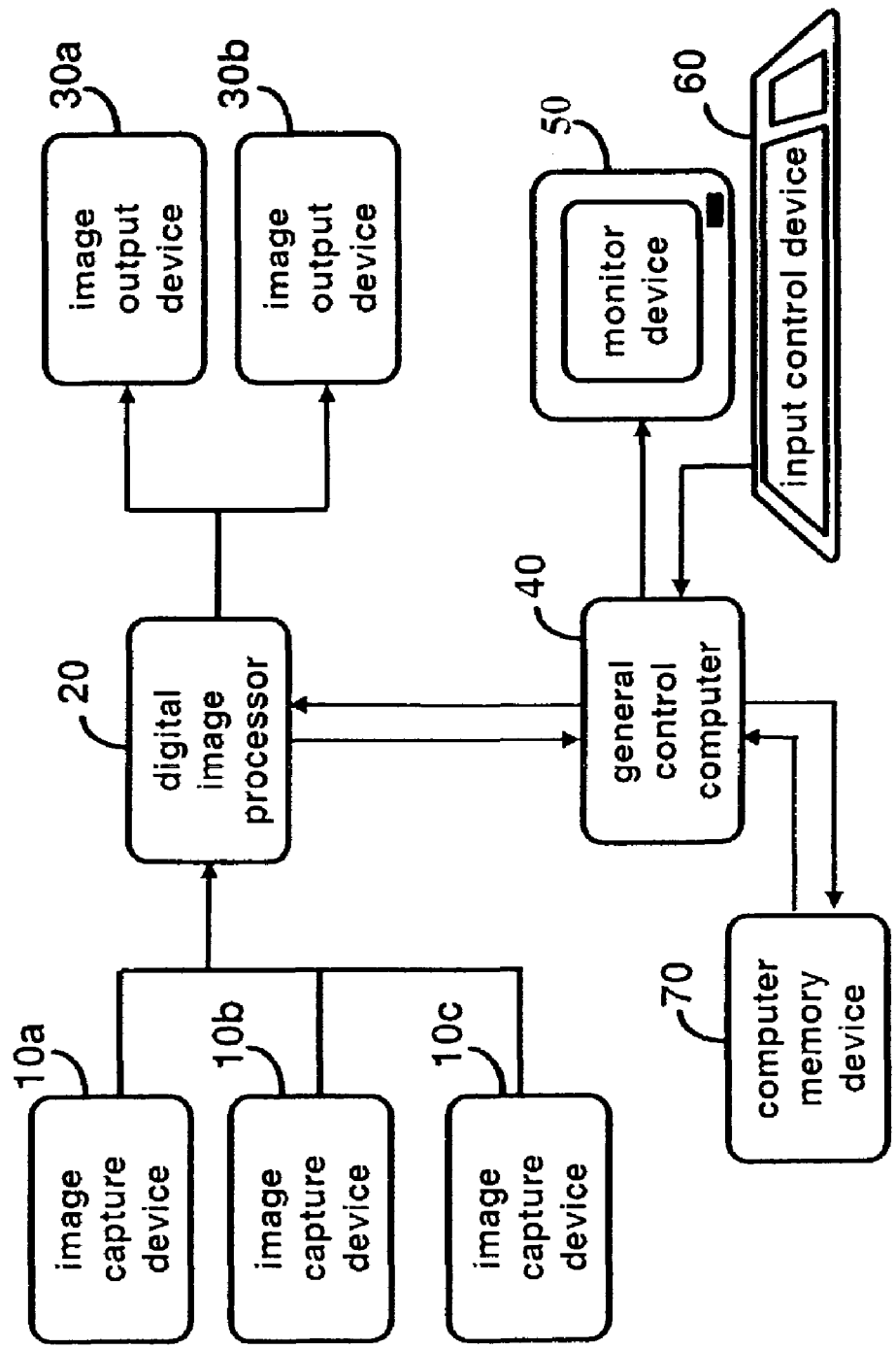
FIG. 1 is a functional block diagram showing the component parts of a system implementation of the present invention.

The present invention may be implemented in computer hardware. Referring to FIG. 1, the following description relates to a digital imaging system which includes an image capture device 10, a digital image processor 20, image output devices 30a and 30b, and a general control computer 40. The system may include a monitor device 50 such as a computer console or paper printer. The system may also include an input control device 60 for an operator such as a keyboard and or mouse pointer. Still further, as used herein, the present invention may be implemented as a computer program and may be stored in a computer memory device 70, i.e. a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well known computer system, such as a personal computer.

Multiple capture devices 10a, 10b, and 10c are shown illustrating that the present invention can be used for digital images derived from a variety of imaging devices. For example, FIG. 1 can represent a digital photofinishing system where the image capture device 10a may be a film scanner device which produces digital images by scanning a conventional photographic image, e.g. color negative film or slide film transparencies. Similarly, image capture device 10b could be a digital camera. The digital image processor 20 provides the means for processing the digital images to produce pleasing looking images on an intended output device or media. Multiple image output devices 30a and 30b are shown illustrating that the present invention may be used in conjunction with a variety of output devices which may include a digital photographic printer and soft copy display. It should also be noted that the present invention can be implemented within the hardware and software of a digital camera such that the digital images produced by the digital camera have been processed with the present invention prior to being exported by the digital camera.

Figure 2:
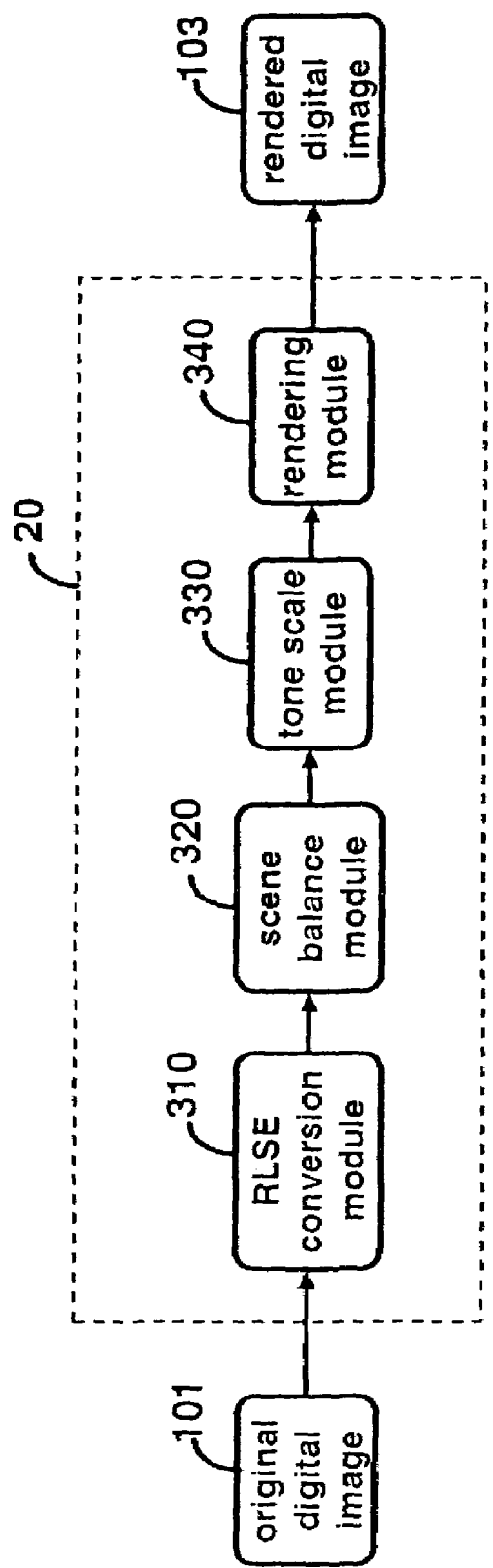
FIG. 2 is a functional block diagram of the digital image processor.

The digital image processor 20 depicted in FIG. 1 is illustrated in more detail in FIG. 2. The cascaded image processing modules shown in FIG. 2 represents a digital image processing path. The original digital image 101 is received from one of the image input devices shown in FIG. 1 and processed to produce a rendered digital image 103 that can be realized on an image output device. The RLSE (relative log scene exposure) conversion module 310 receives the original digital image 101 and generates an RLSE digital image that is prepared for balancing and the application of a tone scale function. The scene balance module 320 receives the RLSE digital image and performs a lightness and color balance adjustment resulting in a source digital image. The tone scale module 330 receives the source digital image, generates a tone scale function from the source digital image, and applies the tone scale function to the source digital image resulting in an enhanced digital image. If the RLSE conversion module 310 and the scene balance module 320 are omitted from the image processing path of modules, the tone scale module 330 receives the original digital image 101 directly as the source digital image. The rendering module 340 processes the enhanced digital image such that the pixel values of the generated rendered digital image 103 have been prepared to yield a pleasing result when used in conjunction with an output image device such as a digital printer. As part of the processing performed by the rendering module 340, a rendering function R(x) is applied to the pixel data of the enhanced digital image to achieve the input to output pixel mapping required of the output image device. The configuration of processing modules shown in FIG. 2 is used for processing digital images that are either monochrome or color in nature. That is, the original digital image 101 includes one or more digital image channels of pixels wherein each digital image channel relates to a different color or pixels, such as an original digital image 101 that includes red, green, and blue representation or a luminance-chrominance representation.

The tone scale functions produced are designed to work best with digital images that are in a relative log scene exposure representation (RLSE).

That is, the pixels of the original digital image 101 have a logarithmic relationship with respect to the original scene intensities of light from which the original digital image 101 is derived. For example, the image capture device 10a shown in FIG. 1 can represent a photographic film scanner that produces digital images that have a linear or logarithmic relationship with the amount of transmitted light projected through a photographic negative or positive film transparency sample. If the pixels values of the resultant original digital image 101 have a logarithm relationship with the received light (i.e. the pixels are in a density representation), the original digital image 101 is considered to be in a relative log scene exposure representation. If the pixels of the original digital image 101 have a linear relationship with the received light, the original digital image 101 is considered to be in a linear exposure representation since, to within a reasonable approximation, the amount of light transmitted through the photographic film sample is linearly proportional to the amount of light received from the original photographed scene. A linear exposure representation digital image can be transformed into a relative log scene exposure representation by a linear-to-logarithmic transform implemented as function or as look-up-table (LUT) with the RLSE conversion module 310 shown in FIG. 2.

The most common representation of digital images produced with digital cameras is a rendered representation, i.e. the digital image has been processed such that it will be yield a natural appearing image on an electronic display device. For most digital images produced with digital cameras the intended output image device is a CRT monitor device sometimes referred to as a gamma domain representation. Rendered digital images can also be transformed into a relative log scene exposure representation using a LUT transform. For digital images produced with digital cameras, the transform includes an inverse of the power law function associated with the intended electronic display device followed by an inverse rendering tone scale function related to the rendering tone scale function that the digital camera used to produce the original digital image 101. Alternatively, the method disclosed by McCarthy et al. in commonly assigned U.S. Pat. No. 6,282,311 can be used to produce an RLSE representation from a rendered digital image.

While the best results are achieved with digital images that are in a relative log scene exposure representation, the present invention can be used to enhance the appearance of digital images that are in other representations such as linear and gamma domain representations described above. In particular, the present invention can be used to process digital images that are in a visual domain such as CIELAB (one of the color spaces defined by the International Commission on Illumination abbreviated as CIE).

The scene balance module 320 receives the RLSE digital image from the RLSE conversion module 310 and performs a lightness and color balance adjustment. The resulting processed digital image is called the source digital image since it is the input digital image to the tone scale module 330. The lightness adjustment to the pixel data accounts for exposure variability in the original digital image 101. The present invention can be used with any algorithm that performs a lightness adjustment, or luminance balance, of the input pixel data.

In particular, the lightness balance procedure includes calculating one or more prediction features from the RLSE digital image. These predication features are combined using a linear equation of the prediction features into a single brightness balance value that relates to an estimate of the pixel value corresponding to a theoretical 18% gray scene reflector. While there are many such prediction features that are useful, the present invention uses a spatial activity measure as the most important prediction feature. An RLSE luminance-chrominance digital image is generated from the RLSE digital image. Next, a spatial activity filter is applied to the luminance pixel data of the RLSE luminance-chrominance digital image. The spatial activity filter calculates the minimum difference of adjacent pixel values within a 3 by 3 pixel region and assigns the minimum difference to the pixel. Pixels with minimum difference values that exceed a predetermined threshold are averaged to produce the first prediction feature. The second prediction feature is calculated by dividing the luminance pixels of the RLSE luminance-chrominance digital image into four strips and calculating the average the maximum pixel value from each of the four strips. Other prediction features that have proved to be useful are the average pixel value and the 90% cumulative histogram pixel value.

After the brightness balance value of the RLSE digital image has been calculated, the color cast of the RLSE digital image is calculated that can be used to remove an overall color cast. The principle causes of color casts are variation in the color of the source illumination and secondarily the color fidelity of the image sensor that recorded the original digital image. A color balance position is calculated for the RLSE digital image, which represents the chrominance coordinates of a theoretical color-neutral scene reflector. The color balance position is calculated using a two dimensional Gaussian weighting surface applied to the chrominance pixel data of the RLSE luminance-chrominance digital image. Although the chrominance pixel data can be averaged in an unweighted manner, better results have been obtained using the two dimensional Gaussian weighting surface. This is principally due to the de-emphasis of highly colorful scene objects from the calculation. A balance look-up-table is calculated for each color of the RLSE digital image using the calculated color balance position and the brightness balance value. The balance look-up-table is applied to the RLSE digital image to produce the source digital image for the tone scale module 330. As a result of the application of the balance look-up-table, pixel values in the RLSE digital image that have a value equal to the predicted balance value are transformed to a value equal to a system defined reference gray point. Similarly, pixels with corresponding chrominance values that correspond to the color balance position will be transformed to a color-neutral position.

The rendering module 340 accepts the enhanced digital image from the tone scale module 330 and prepares the pixel data for display on an output image device. The rendering module 340 performs a color transformation, a tonal rendering transformation, and an output encoding transformation. The pixel data must be transformed such that the pixel data representing different original scene colors are appropriate for the color spectral characteristics associated with the output image device. This can be accomplished in a multiple step procedure. First, the RLSE representation pixel data of the enhanced digital image is transformed into a linear representation. Next, a color matrix transform is applied to the linear representation pixel data. The color matrix can be a 3 by 3 element matrix wherein the elements of the matrix are determined by analyzing a collection of imaged color patch targets and measuring the resultant color produced with the intended output image device.

The other task includes the transformation of the pixel data from the linear or relative-log-scene-exposure representation to a rendered representation with the application of a rendering function R(x). In general, the dynamic range of the enhanced digital image is much larger than can be displayed on typical output image devices such as CRT monitors or photographic paper. Therefore, if the pixel data of the enhanced digital image were received by the output image device directly, much of the pixel data would be clipped in the extreme light and dark parts of the image with a substantial loss of spatial detail. The rendering function performs a graceful roll-off of the pixel data such that the processed pixel data when displayed will result in a gradual loss of spatial detail as pixel values approach the limits of the output image device.

Figure 3A:
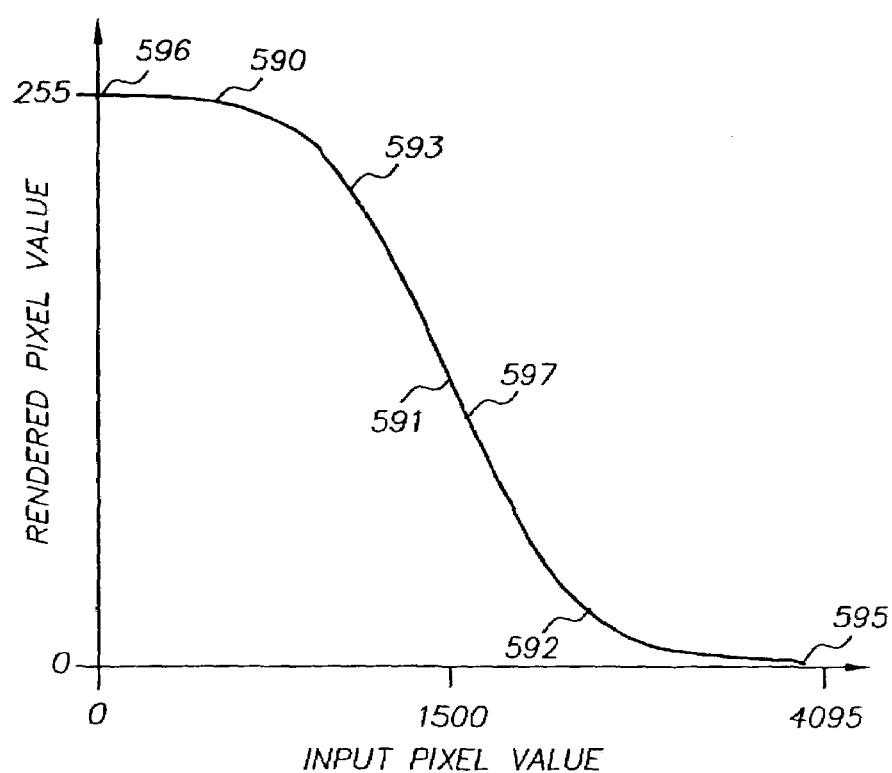
FIG. 3a is a graph of an example of a rendering function.

The present invention can be used with many different mathematical forms for the rendering function such as a rendering function produced with the method disclosed in commonly assigned U.S. Pat. No. 5,300,381 by Buhr et al. In general, optimal results are obtained using rendering functions that have a sigmoid shape, i.e., rendering functions having a zero or near slope for extreme input pixel values and having a maximum magnitude slope that is achieved for mid-tone input values. Some rendering functions can have a relatively high slope for the darkest domain of input pixel values but many rendering functions have a zero or near zero slope characteristic for the lightest domain of pixel values. The rendering function, to an extent, mimics the photo response characteristics of photographic paper used in analog imaging applications. FIG. 3a shows a graph of an example rendering function R(x) (indicated by curve 590) that is suitable for use with the present invention. Point 591 corresponds to an input pixel value equal to the reference gray point. Point 592 indicates the rendering function response for a highlight pixel value corresponding to a light region in the original digital image 101. Point 593 indicates the rendering function response for a shadow pixel value corresponding to a dark region in the original digital image 101. Point 595 indicates the rendering function response corresponding to brightest reproduced output value of the output image device. Similarly, point 596 indicates the rendering function response corresponding to darkest reproduced output value of the output image device. Point 597 indicates the point on the rendering function for which the instantaneous slope has a maximum magnitude, which does not necessarily coincide with the reference gray point 591. The point of maximum magnitude slope is also the inflection point of the sigmoid function, i.e. a local maximum or minimum in the corresponding slope function of the rendering function R(x). The example rendering function shown in FIG. 3a is appropriate for a digital imaging system that uses a 12-bit pixel value representation for processing digital images. Many output display devices accept digital images with an 8-bit pixel value representation. The example rendering function shown in FIG. 3a maps 12-bit input pixel values ranging from 0 to 4095 to output rendering pixel values ranging from 255 to 0.

Figure 3B:
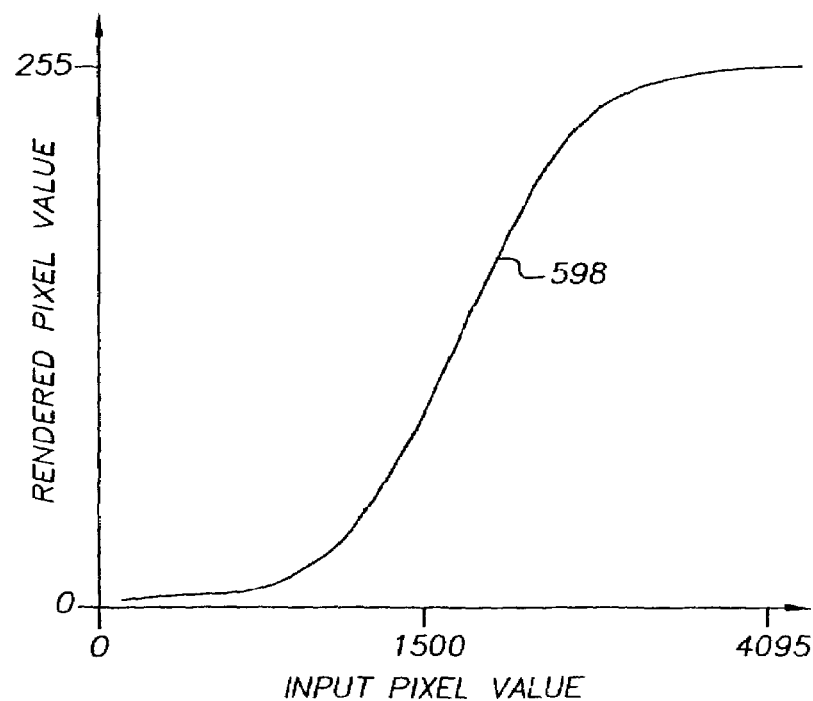
FIG. 3b is a graph of another example of a rendering function.

The example rendering function shown in FIG. 3a is typical for use with a digital printer that produces digital photographic prints. The output pixel value scale shown can relate to photographic paper densities, e.g. the digital printer can be calibrated such that each pixel code value is equal to 100 times the optical density that will be produced on the print. However, the present invention can also be used with electronic display devices. A typical rendering function for use with an electronic display device is shown in FIG. 3b as indicated by curve 598. Note that the rendering function R(x) shown in FIG. 3b produces higher numerical output rendering pixel values for higher numerical input pixel values. For a typical computer monitor device, the output pixel values will range from 0 (representing black) to 255 (representing white). The example rendering function shown in FIG. 3b maps 12-bit input pixel values ranging from 0 to 4095 to output rendering pixel values ranging from 0 to 255.

The last operation performed by the rendering module 340 is the encoding of the output pixel values for use with an output image device. Most output image devices are calibrated to accept pixel data with a known implied relationship. For example, some digital image printers are calibrated to accept visual lightness related pixel data while other devices are calibrated for optical density related pixel data. The encoding operation performs an intensity transformation that prepares the pixel data for the specific device.

The rendering module 340 can also perform the operation of preparing the image pixel data of the enhanced digital image for an unspecified output image device. For example, the pixel data can be transformed into CIE XYZ coordinates such as defined by the International Image Consortium's Profile Connection Space.

Referring to FIG. 2, the chain of image processing modules is designed to work well with or without the inclusion of the tone scale module 330. The scene balance module 320 accommodates exposure and illumination system variability. The rendering module 340 prepares the image data for viewing on an output image device. It will be appreciated by those skilled in the art that the digital image processor 20 as depicted in FIG. 2 without the use of the tone scale module 330 will yield acceptable photographic results. That is, the contrast, lightness, and color reproduction of the system are set for optimal photographic results for the majority of typical digital images. The inclusion of the tone scale module 330 enhances the appearance of the processed digital images such that digital images that deviate from the norm, in terms of dynamic range, will be tonally enhanced, and digital images that are at the norm for the system will be unaltered by the tone scale module 330. For a typical implementation of the present invention, the dynamic range of the original digital images 101 (ratio of corresponding original scene intensities based on the extremes of the image) is approximately 64 to 1. The enhanced digital images corresponding to processed original digital images 101 that have approximately a 64 to 1 dynamic range will be little affected by the tone scale module 330. Conversely, the enhanced digital images corresponding to processed original digital images 101 that have a dynamic range greater than 64 to 1 and less than 64 to 1 can be significantly enhanced by the tone scale module 330, i.e. rendered with more detail and more color saturation. In particular, low contrast original digital image will, in general, experience a contrast gain, while high contrast original digital images will, in general, experience a reduction in contrast resulting in more spatial detail and more saturated color.

Figure 4:
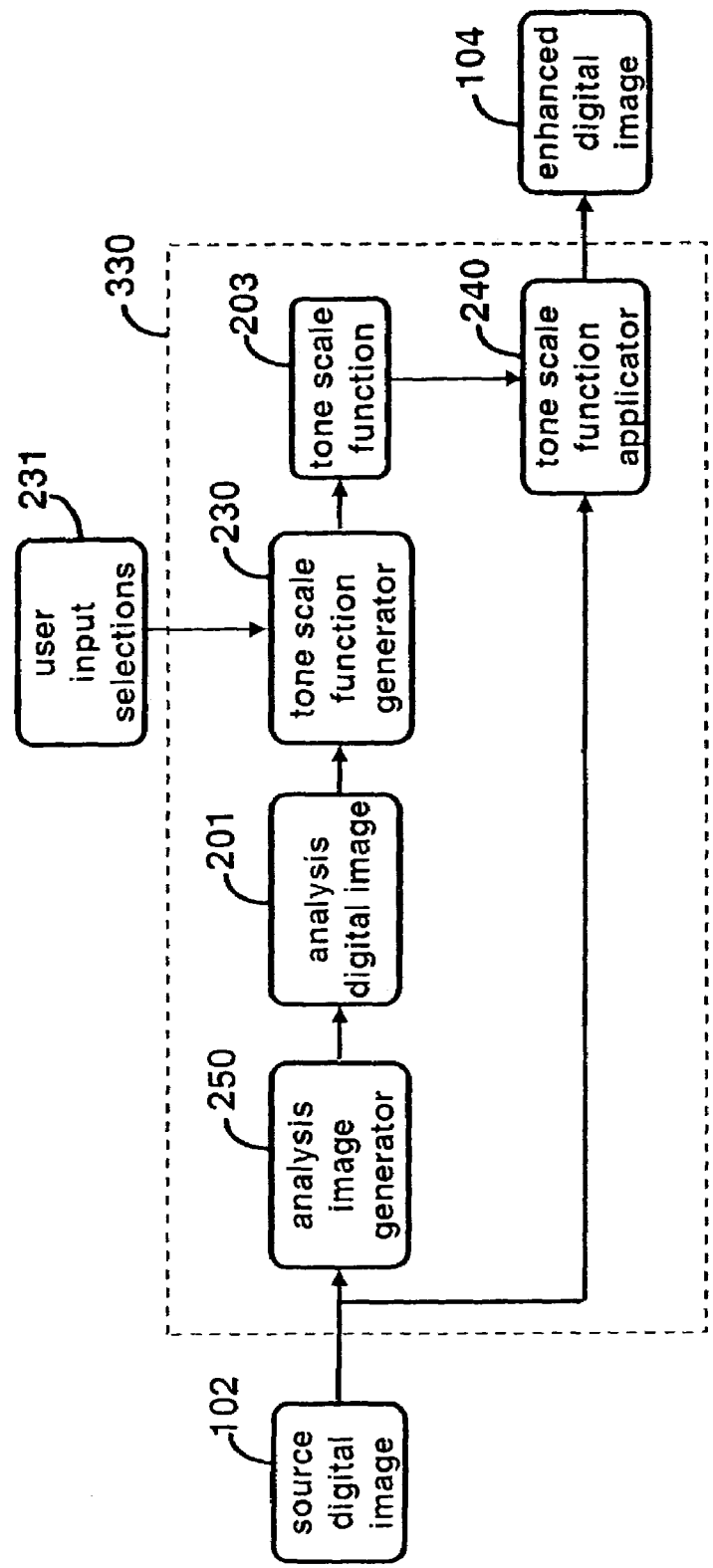
FIG. 4 is a functional block diagram of the tone scale module.

The tone scale module 330 depicted in FIG. 2 is illustrated in more detail in FIG. 4. The source digital image 102 is received by the analysis image generator 250 which produces a lower spatial resolution digital image from source digital image 102 called the analysis digital image 201. The tone scale function generator 230 receives the analysis digital image 201, analyzes the content of the analysis digital image 201, and produces the tone scale function 203. The tone scale function is a single valued function that is defined for the range of pixel values in the source digital image 102. The tone scale function applicator 240 applies the tone scale function 203 to the source digital image 102 to generate the enhanced digital image 104. The shape of the tone scale function determines the contrast and lightness changes that will be imparted to the enhanced digital image 104.

Figure 5A:
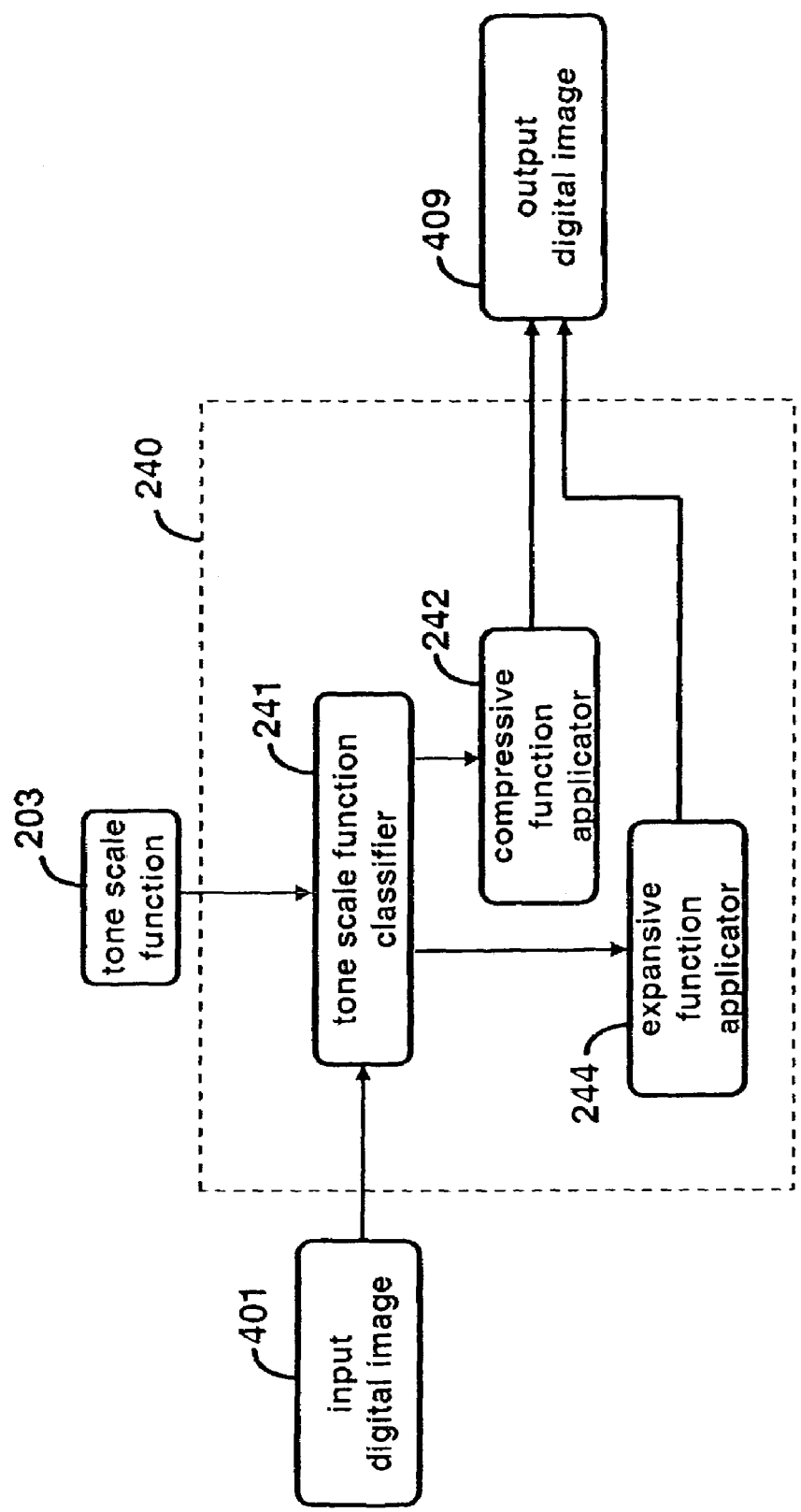
FIG. 5a is a functional block diagram of the tone scale function applicator.

The tone scale function applicator 240 shown in FIG. 4 is shown in more detail in FIG. 5a. The tone scale function classifier 241 receives and analyzes the tone scale function 203. The tone scale function 203 is determined to be either a compressive function or an expansive function. The tone scale function is classified as a compressive function if the range of output numerical pixel values is less than the range of input numerical pixel values. Conversely, the tone scale function is classified as an expansive function if the range of output numerical pixel values is greater than the range of input numerical pixel values. The tone scale function classifier also receives an input digital image 401. If the tone scale function 203 is classified as a compressive function, the input digital image 401 and the tone scale function 203 are directed to the compressive function applicator 242. Similarly, if the tone scale function 203 is classified as an expansive function, the input digital image 401 and the tone scale function 203 are directed to the expansive function applicator 242. Therefore, either the compressive function applicator 242 or the expansive function applicator 244 is used to process the input digital image 401 to produced the output digital image 409 which is the enhanced digital image 104 shown in FIG. 4.

While the present invention can be used with any method of generating a tone scale function, the preferred embodiment uses tone scale functions that are constructed from two tone scale segments. However, regardless of the tone scale function construction method, the tone scale function can be classified as either compressive or expansive. The present invention can be used with any tone scale function classification method. For example, the average slope of the tone scale function 203 can be calculated and compared with a predetermined threshold value. If the average slope is greater than the predetermined threshold the tone scale function 203 is classified as an expansive function. Otherwise the tone scale function 203 is classified as a compressive function.

The preferred embodiment of the present invention uses a histogram based method for determining the tone scale function classification. The input digital image 401 is analyzed by calculating a histogram function of the luminance pixel information, i.e. a frequency of occurrence function. The cumulative 1.0 and 99.0 percentile luminance pixel values are calculated from the histogram function and denoted by $P_1$ and $P_{99}$ respectively. The value of the corresponding output pixel values produced with the tone scale function 203 are recorded as $T_1$ and $T_{99}$ respectively. The tone scale function 203 is classified as a compressive function if the difference between $T_{99}$ and $T_1$ is less than or equal to the difference between $P_{99}$ and $P_1$. Otherwise the tone scale function 203 is classified as an expansive function. Other classification rules can also be used to classify the tone scale function 203. For example, the tone scale function 203 can be classified as expansive only if the ratio of the difference between the $T_{99}$ and $T_1$ relative to the difference between the difference between $P_{99}$ and $P_1$ exceeds a predetermined threshold value.

Figure 6A:
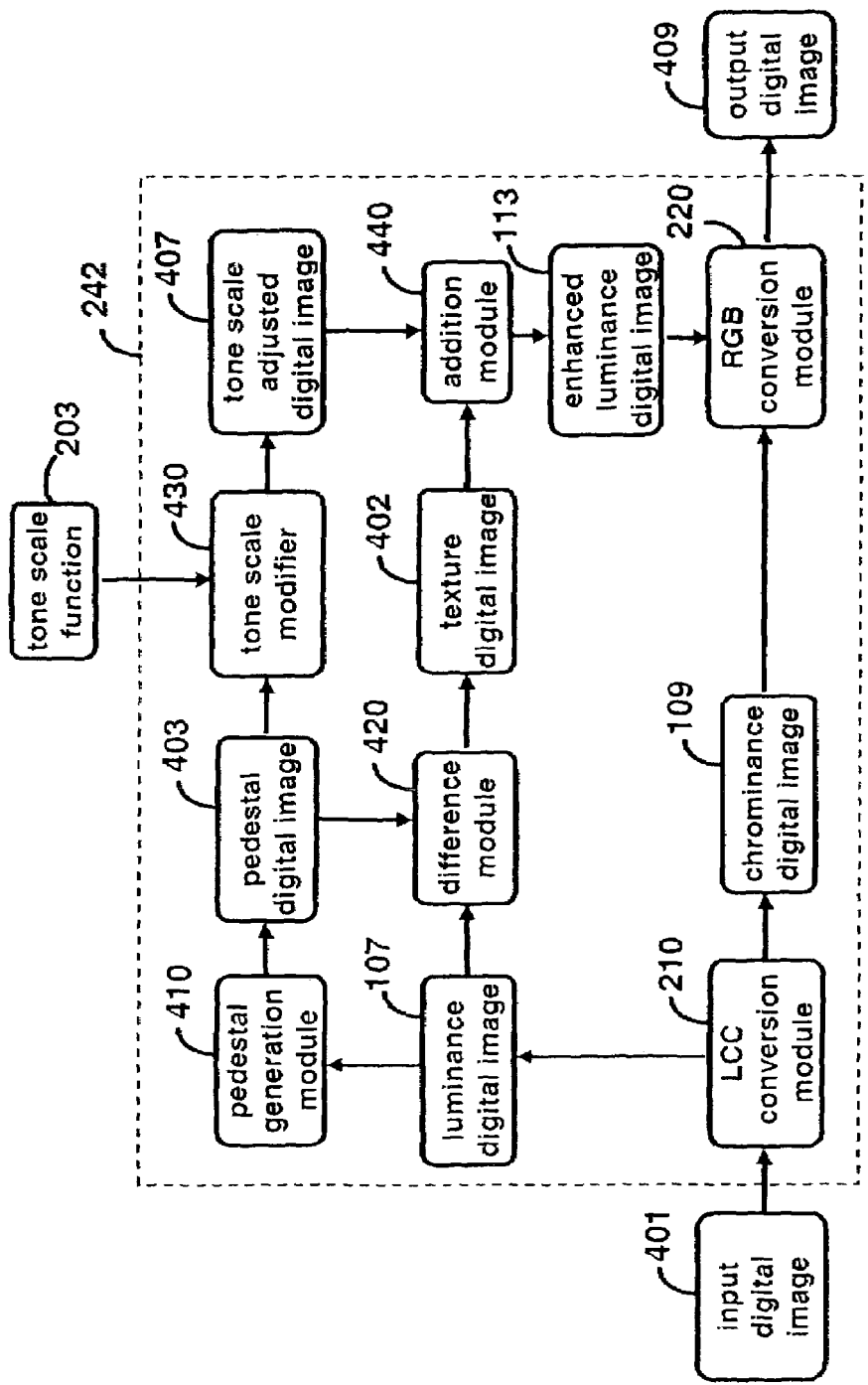
FIG. 6a is a functional block diagram of the compressive function applicator.

The compressive function applicator 242 shown in FIG. 5a is shown in more detail in FIG. 6a. The LCC conversion module 210 receives the input digital image 401 in the form of a red-green-blue image representation and generates a luminance digital image 107 containing one digital image channel and a chrominance digital image 109 containing two digital image channels. The pedestal generation module 410 receives the luminance digital image 107 and produces the pedestal digital image 403. The pedestal generation module 410 employs a spatial filter, applied to the luminance digital image 107, that removes texture from the luminance digital image 107 but leaves edge information. In the context of the present invention, texture refers to image content including fine spatial detail and spatial shading structure. As a natural consequence of the filter, noise is also removed. Thus, the pedestal digital image 403 is a highly smoothed version of the luminance digital image 107 with much of the edge content of the luminance digital image 107. The pedestal digital image 403 is subtracted from the luminance digital image 107 by the difference module 420 resulting in the texture digital image 402. It will be appreciated that all of the information of the luminance digital image 107 is contained in either the pedestal digital image 403 or the texture digital image 402. The tone scale modifier applicator 430 applies the tone scale function 203 directly to the pixels of the pedestal digital image 403 resulting in the tone scale adjusted digital image 407. Therefore, the tonal characteristics of the pedestal digital image 403 are enhanced by the application of the tone scale function 203 without affecting the texture content of the luminance digital image 107. The addition module 440 combines the tone scale adjusted digital image 407 with the texture digital image 402 to produce the enhanced luminance digital image 113. Therefore, the enhanced luminance digital image 113 is a tone scale enhanced version of the luminance digital image 107 that has the texture image structure content of the luminance digital image 107. The RGB conversion module 220 receives the enhanced luminance digital image 113 and the chrominance digital image 109 and produces the output digital image 409.

Applying a tone scale function by using a spatial filter is particularly advantageous when the tone scale function is compressive. When compressive tone scale functions are applied directly to an input digital image, the tonal characteristics will be enhanced but the texture image structure can be diminished in magnitude. Using a spatial filter to apply the tone scale function can achieve the desired tone scale enhancement while maintaining the texture image structure. A variety of spatial filters can be used to achieve an improved result. The present invention uses the spatial filter disclosed in commonly assigned U.S. Pat. No. 6,317,521 by Gallagher et al. which employs the use of a control, or masking, signal to preserve the edges in the pedestal digital image 403. The present invention can also be used with a similar method disclosed by Lee in commonly assigned U.S. Pat. No. 6,285,798. Another spatial filter that can be employed is a simple low-pass filter, such as a two dimensional Gaussian filter. However, if a low-pass filter is used, the dimension of the Gaussian standard deviation parameter should be very large, e.g. one quarter of the dimension of the digital image being processed.

It should also be noted that the input digital image 401 to the compressive function applicator 242 can be processed with the spatial filtering technique directly in a red-green-blue image representation. For this embodiment, the red, green, and blue digital image channels of the input digital image 401 are spatially filtered individually using the spatial filter described above to produce a first and second signal for each digital image channel. The first and second signal for each digital image channel when added together result in a signal equal to the unfiltered digital image channel. The tone scale function 203 is then applied to the first signal corresponding to each digital image channel to produce a modified first signal. The modified first signal from each digital image channel is then combined with the corresponding second signal to produce a modified digital image channel of each color wherein the modified digital image channels constitute the enhanced digital image 104.

It is important to note that for tone scale functions classified as compressive functions the chrominance characteristics (the color characteristics apart from the luminance characteristics) of the enhanced digital image 104 are essentially the same as the source digital image 102. This is true for both the methods of applying the tone scale function 203 to a red-green-blue image representation and applying the tone scale function 203 to a luminance-chrominance image representation. In general, compressive tone scale functions are applied to enhance the luminance characteristics of a digital image. Therefore, there is no need to modify the chrominance characteristics of the processed digital images in a manner related to the nature of the applied compressive tone scale function. This should not be interpreted to imply that no further color enhancement to the enhanced digital image 104 may be necessary or advantageous. However, no further processing of the chrominance characteristics are necessary to compensate for the applied compressive tone scale function.

Figure 6B:
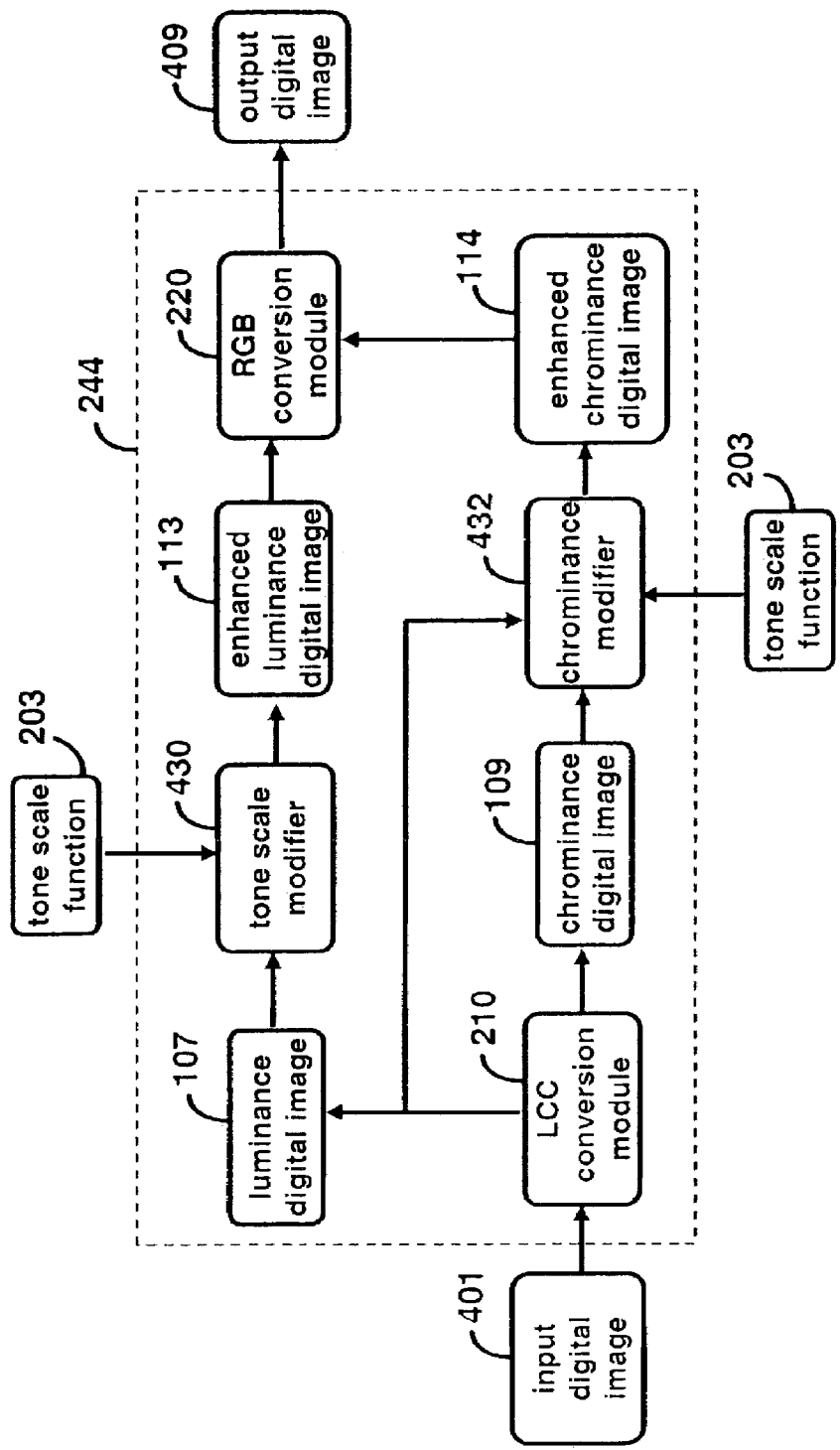
FIG. 6b is a functional block diagram of the expansive function applicator.

The expansive function applicator 244 shown in FIG. 5a is shown in more detail in FIG. 6b. The LCC conversion module 210 receives the input digital image 401 in the form of a red-green-blue image representation and generates a luminance digital image 107 containing one digital image channel and a chrominance digital image 109 containing two digital image channels. The tone scale modifier 430 applies the tone scale function 203 directly to the pixels of the luminance digital image 107 resulting in the enhanced luminance digital image 113. Therefore, the tonal characteristics of the luminance digital image 107 are enhanced by the application of the tone scale function 203 while also amplifying the spatial detail, i.e. the texture content of the luminance digital image 107. The chrominance modifier 432 receives the tone scale function 203, the luminance digital image 107, and the chrominance digital image 109 and amplifies the chrominance pixel values in accordance with the tone scale function 203. Specifically, the chrominance modifier 432 first calculates a slope function s( ) for the received tone scale function 203. Next a chrominance amplification factor ($\alpha$) is calculated for each luminance pixel value ($\lambda$) given expression (1)

$$\alpha(\lambda) = \mu(s(\lambda) - 1.0) + 1.0 \qquad (1)$$

where the parameter μ regulates the degree of chrominance amplification. For example, if the parameter R is set to 1.0, the chrominance pixel values will be amplified by the same degree as the luminance pixel values. That is, the luminance contrast is increased by the same percentage as the color contrast. If the μ parameter is set to zero, the chrominance pixel values will remain the same and there will be no color contrast amplification. Through experimentation, the preferred value for the μ parameter has been determined to be 0.5. By setting the μ parameter to 0.5, low contrast images can be enhanced by an expansive tone scale function without excessively amplifying the color. This is particularly useful for enhancing low contrast images that contain faces. Thus, it will be appreciated that for tone scale functions that have been classified as expansive, the chrominance characteristics of the resultant enhanced digital image 104 are amplified relative to the source digital image 102.

Figure 5B:
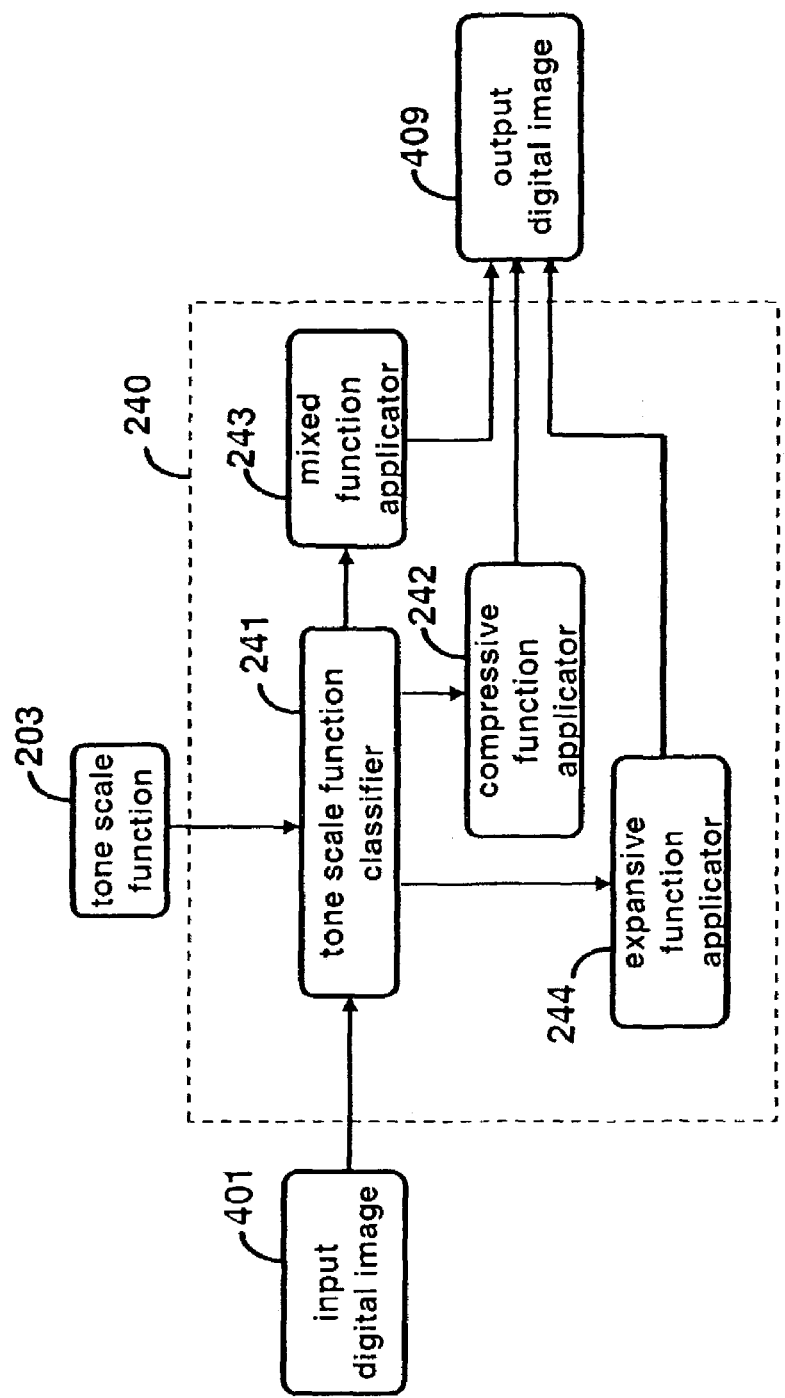
FIG. 5b is a functional block diagram for another embodiment of the tone scale function applicator.

As will be discussed in more detail below, the tone scale function 203 can be constructed from two parts or tone scale segments. Each of these tone scale segments can be classified as either compressive or expansive with the technique as describe above. In this embodiment of the present invention, the tone scale function applicator 240 shown in FIG. 4 can be employ a tone scale function classifier 241 that classifies the tone scale function 203 into three categories as shown in FIG. 5b. If each of the tone scale segments that make up the tone scale function have individually been classified as a compressive function, the tone scale function 203 is classified as a compressive function and the input digital image 401 is processed with the compressive function applicator 242. Similarly, if each of the tone scale segments that make up the tone scale function have individually been classified as an expansive function, the tone scale function 203 is classified as a expansive function and the input digital image 401 is processed with the expansive function applicator 244. However, if the one of the tone scale segments has been classified as an expansive function and the other tone scale segment has been classified as a compressive function, the tone scale function 203 is classified as a mixed expansive-compressive function and the input digital image 401 is processed with the mixed function applicator 243. For this embodiment of the present invention, the compressive function applicator 242 and the expansive function applicator 244 as described above are used.

For this embodiment of the present invention, the classification of the tone scale function into three categories provides a means for enhancing both the color characteristics, via the chrominance digital image channels, and the spatial characteristics, via the luminance digital image channel, of digital images as a function of the shape of the tone scale function 203. Specifically, for purely compressive tone scale functions the color characteristics are maintained while the spatial characteristics are also preserved by applying the tone scale function with the spatial filter employed by the pedestal generation module 410. For purely expansive tone scale functions, the color and spatial characteristics are amplified as a function of the slope of the applied tone scale function. For mixed expansive-compressive tone scale functions, the spatial filter is employed by the pedestal generation module 410 and the color and spatial characteristics are amplified as a function of the slope of the applied tone scale function. Since the slope is less than 1.0 for the compressive portion of the tone scale function 203, the color and spatial characteristics of the processed digital image are amplified just for pixels that correspond to the compressive portion of the tone scale function 203. Thus, the present invention provides a method for selectively altering the color and spatial characteristics of digital images based on a classification of the applied tone scale function.

Figure 6C:
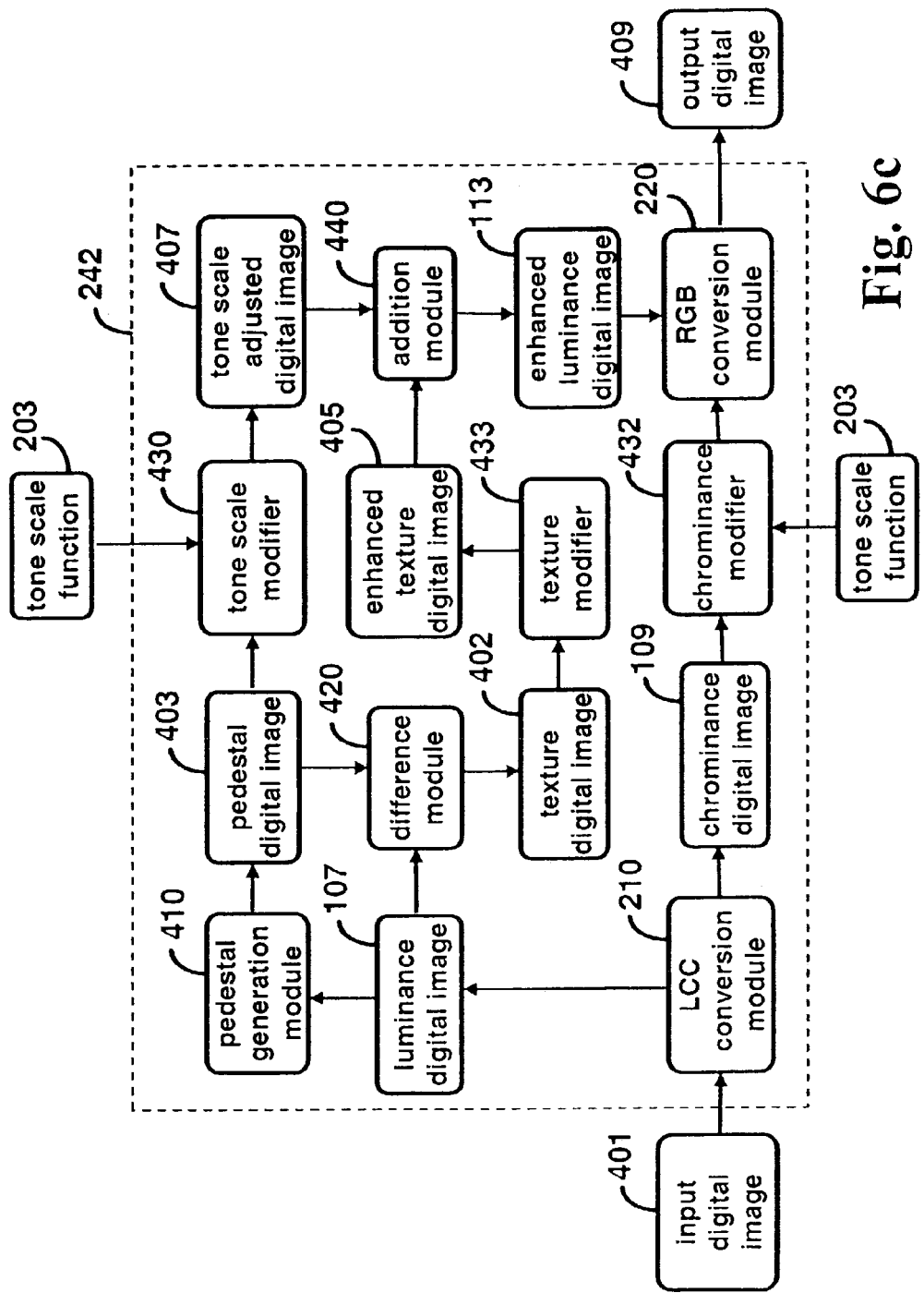
FIG. 6c is a functional block diagram of the mixed function applicator.

The mixed function applicator 243 shown in FIG. 5b is shown in more detail in FIG. 6c. The processing of the image pixel data is similar to both the compressive function applicator 242 (shown in FIG. 6a) and the expansive function applicator 244 (shown in FIG. 6b) since a tone scale function classified as a mixed expansive-compressive function has both a compressive and an expansive nature. The mixed function applicator 243 employs the same pedestal generation module 410 as the compressive function applicator 242 to ensure that image spatial detail is not harmed in the process of applying the compressive part of the tone scale function 203. The mixed function applicator 243 also employs the same chrominance modifier 432 (shown in FIG. 6b) as the expansive function applicator 244 to amplify the chrominance pixel data for the expansive part of the tone scale function 203. However, unlike the compressive function applicator 242 and the expansive function applicator 244, the mixed function applicator 243 employs a texture modifier 433 which amplifies the texture digital image 402 for the expansive part of the tone scale function 203.

Referring to FIG. 6c, the LCC conversion module 210 receives the input digital image 401 in the form of a red-green-blue image representation and generates a luminance digital image 107 containing one digital image channel and a chrominance digital image 109 containing two digital image channels. The luminance digital image 107 is spatially filtered as described above by the pedestal generation module 410, which produces the pedestal digital image 403. The difference module 420 subtracts the pedestal digital image 403 from the luminance digital image 107 to produce the texture digital image 402. The texture modifier 433 amplifies the texture digital image 402 in accordance with tone scale function 203 (not shown and described in more detail below) and produces the enhanced texture digital image 405. The tone scale modifier 430 applies the tone scale function 203 to the pedestal digital image 403 to produce the tone scale adjusted digital image 407. The addition module 440 adds the tone scale adjusted digital image 407 with the enhanced texture digital image 405 to produce the enhanced luminance digital image 113. The chrominance modifier 432 amplifies the chrominance digital image 109 in accordance with the tone scale function 203 to produce an enhanced chrominance digital image 114. The enhanced chrominance digital image 114 is then combined with the enhanced luminance digital image 113 by the RGB conversion module 220 to produce the output digital image 409.

Within the mixed function applicator 243, the tone scale modifier 430 applies the tone scale function 203 directly to the pixels of the pedestal digital image 403 resulting in the tone scale adjusted digital image 407. Therefore, the tonal characteristics of the luminance digital image 107 are enhanced by the application of the tone scale function 203 while not amplifying the texture content of the luminance digital image 107. The texture modifier 433 receives the tone scale function 203 (not shown), the luminance digital image 107 (not shown), and the amplifies the pixels values of the texture digital image 402 in accordance with the tone scale function 203 (not shown). Specifically, the texture modifier 433 first calculates a slope function s( ) for the received tone scale function 203 or preferably uses the slope function s( ) calculated by the chrominance modifier 432. Next a texture amplification factor (β) is calculated for each luminance pixel value (λ) given expression (2)

$$\beta(\lambda)=\nu(s(\lambda)-1.0)+1.0 \text{ for } s(\lambda)>1.0 \quad (2)$$

$$\beta(\lambda)=1.0 \text{ for } s(\lambda)<=1.0$$

where the parameter ν regulates the degree of texture amplification. For example, if the parameter ν is set to 1.0, the pixel values of the texture digital image 402 will be amplified by the same degree as if tone scale function 203 had been applied directly to the pixels of the luminance digital image 107, i.e. without using a spatial filter. If the ν parameter is set to zero, the texture pixel values will remain the same and there will be no texture amplification. Through experimentation, the preferred value for the ν parameter has been determined to be 1.0. However, expression (2) provides a mechanism for regulating the degree of texture amplification should a value of less than 1.0 be desired by a digital imaging application. It should be noted that the value of β(λ) in expression (2) does not have to be greater than or equal to 1.0. For example, the parameter ν can be set to a value lower than 1.0 if a high magnitude noise content has been estimated for the input digital image 401.

In a still further embodiment of the present invention, the tone scale function 203 is classified as either an expansive function or a compressive function as described above and illustrated in FIG. 5a. For this embodiment, the tone scale function 203 is constructed with two tone scale segments, each of which is classified individually as a compressive or expansive function. If either tone scale segment is classified as an expansive function, the tone scale function is classified as expansive. The compressive function applicator 242 as described above is employed when the tone scale function 203 is classified as compressive. When the tone scale function 203 is classified as expansive, the mixed function applicator 243, as described above and shown in FIG. 6c, is substituted for the expansive function applicator 242. Therefore, for this embodiment of the present invention, a spatial filter is always used by a pedestal generation module to apply the tone scale function 203.

The LCC module 210 shown in FIG. 6a and FIG. 6b employs a 3 by 3 element matrix transformation to convert the red, green, and blue pixel values of the source digital image 102 into luminance and chrominance pixel values. Let the variables $R_{ij}$, $G_{ij}$, and $B_{ij}$ refer to the pixel values corresponding to the red, green, and blue digital image channels located at the $i^{th}$ row and $j^{th}$ column. Let the variables $L_{ij}$, $GM_{ij}$, and $ILL_{ij}$ refer to the transformed luminance, first chrominance, and second chrominance pixel values respectively of an LCC representation digital image. The 3 by 3 elements of the matrix transformation are described by (2)

$$L_{ij}=0.333R_{ij}+0.333G_{ij}+0.333B_{ij} \quad (2)$$

$$GM_{ij}=-0.25R_{ij}+0.50G_{ij}-0.25B_{ij}$$

$$ILL_{ij}=-0.50R_{ij}+0.50B_{ij}$$

The RGB conversion module 220 shown in FIG. 6a and FIG. 6b employs a 3 by 3 element matrix transformation to convert the luminance and chrominance pixel values into red, green, and blue pixel values by performing the inverse matrix operation to the LCC conversion module 210. The matrix elements of the RGB conversion module are given by (3) and represents the inverse matrix of the matrix given by (1).

$$R_{ij}=L_{ij}-0.666GM_{ij}-ILL_{ij} \quad (3)$$

$$G_{ij}=L_{ij}+1.333GM_{ij}$$

$$B_{ij}=L_{ij}-0.666GM_{ij}+ILL_{ij}$$

The tone scale function generator 230 shown in FIG. 4 is described in more detail hereinbelow. The tone scale function generator 230 can be used in either an automatic mode, wherein the tone scale function 203 is calculated using the pixels of the analysis digital image 201, or in a manual mode, wherein the tone scale function 203 is calculated using user input selections 231 provided via a graphical user interface.

The tone scale function 203, is a single valued function, i.e. one output pixel value for each input pixel value, defined for the range of pixels values in the source digital image 102. The shape of the tone scale function 203 is important since the shape determines the effect on the processed digital images. The tone scale function 203 is constructed from two function segments wherein the two function segments share just one input pixel value in common. A reference gray point pixel value corresponding to an 18% scene reflector is defined as the input pixel value in common that divides the function domain into the two tone scale segments. The function segment relating to the brighter image regions, i.e. image regions corresponding to bright regions of the original photographed scene, is called the highlight tone scale segment. The function segment relating to the darker image regions, i.e. image regions corresponding to dim regions of the original photographed scene, is called the shadow tone scale segment. It should be noted that the tone scale function 203 is a continuous function insofar as the implementation in computer software and/or hardware will allow. It should also be noted that the tone scale function 203 can have a continuous first derivative.

An important aspect of the construction of the tone scale function 203 is the use of a different mathematical function for two different tone scale segments. Using a different mathematical function for each tone scale segment allows the tone scale function 203 to be independently controllable in each of the tone scale segments allowing for a greater degree of customization for the digital image to be processed.

The pixel polarity of a digital image used in a digital imaging system is an arbitrary decision made by the system architect. For example, positive pixel polarity digital images have pixels wherein higher numerical values relate to more light having been received. Conversely, negative pixel polarity digital images have pixels wherein higher numerical values relate to less light having been received. The present invention can be used with digital images of either pixel polarity. However, in the interest of clarity, the following description will assume a positive pixel polarity convention. Those skilled in the art will recognize that references made to the increasing or decreasing function slope values are with respect to positive pixel polarity digital images. The description of function slope characteristics must be reversed for systems using negative pixel polarity digital images. This is an important aspect of interpretation since mathematically an increasing or decreasing function is defined with respect to numerically increasing abscissa values. For example, in the description of the construction of the highlight and shadow component functions given hereinbelow, some shadow component functions are described as having a monotonically increasing slope property while some highlight component functions are described as having a monotonically decreasing slope property. This description is with regard to a positive pixel polarity convention. For a negative pixel polarity convention, the equivalent shadow component functions would be described as having a monotonically decreasing slope property while the equivalent highlight component functions would be described as having a monotonically increasing slope property. Similarly, for a positive pixel polarity convention, the tone scale function has a slope function that is always greater than or equal to zero.

The highlight tone scale segment is constructed from one or more component functions some of which satisfy the following constraints: 1) the component function can have a monotonically decreasing slope function for all input pixel values equal to or greater than the reference gray point; and 2) the component function can have a monotonically increasing function value for all input pixel values equal to or greater than the reference gray point and less than or equal to a maximum input pixel value expressed in the digital image. At the reference gray point, the two tone scale function segments can have the same value. A function is monotonic over a given domain if the function has constant sign (for digital implementations the slope function is taken as a reasonable approximation of the first derivative function). It should also be noted that the function characteristics for input pixel values greater than what is expressed in a particular image is an academic issue since no pixels will be affected. Both of the above mentioned constraints are important and require some explanation.

The highlight tone scale segment relates to the bright pixels, i.e. pixels relating to more light having been received. In general, for high dynamic range digital images the corresponding rendered digital images produced without the present invention have little or no spatial detail in the very brightest image regions. This is a consequence of the overall high system contrast required to pleasingly render digital images of average dynamic range. Therefore, for high dynamic range digital images some of the image content contained in the bright pixels cannot be rendered such that spatial detail modulation is preserved in the rendered digital image 103. Improved spatial detail modulation can be achieved if the tone scale function 203 maps high input pixel values to lower output pixel values. This results in processed digital images with darker highlight content in the resultant rendered digital image 103. There are many functions that can perform such an input to output mapping operation. However, monotonically increasing functions have been experimentally determined to be more robust, i.e. produce fewer image artifacts, than functions that are not monotonic.

While many monotonic functions can achieve the operation of mapping high input pixel values to lower output pixel values, all functions impose some form of compromise in contrast with regard to image regions corresponding to different average pixel values. In particular, the instantaneous slope value (first derivative) of the component functions used to construct the highlight tone scale segment can significantly affect the perception of contrast and spatial detail modulation in the resultant rendered digital image 103. Therefore, the highlight tone scale segment constructed using component functions having a monotonically decreasing instantaneous slope value can improve the rendering of spatial detail modulation for bright image regions by mapping highlight pixels to lower output pixel values. Image regions corresponding to higher instantaneous slope values within the domain of the highlight tone scale segment tend to preserve more image detail modulation. Thus, the monotonically decreasing instantaneous slope condition advantages image content corresponding to pixel values that are numerically closer in value to the reference gray point. In general, important image content, such as the main subject region, tends to be numerically closer to the reference gray point while background image content tends to be exhibited more uniformly with regard to pixel values.

Similarly, the shadow tone scale segment is constructed from one or more component functions some of which satisfy the following constraints: 1) the component function can have a monotonically increasing slope function for all input pixel values equal to or less than the reference gray point; and 2) the component function can have a monotonically increasing function value for all input pixel values equal to or less than the reference gray point and greater than or equal to a minimum input pixel value expressed in the digital image. Similarly, the monotonicity property of the component functions used to construct the shadow tone scale segment relates to more robust image quality results. The monotonically increasing slope function property of the component functions used to construct the shadow tone scale segment is similarly important since this condition also advantages image content corresponding to pixel values that are numerically closer in value to the reference gray point. For high dynamic range images, the monotonically increasing slope function property of the component functions used to construct the shadow tone scale segment achieves a low input pixel value to higher output pixel value mapping operation. This results in processed digital images with lighter shadow content in the resultant rendered digital image 103.

A natural consequence of the above mentioned slope function constraints produces tone scale functions that have high slope function values at the reference gray point. Therefore, the choice of the reference gray point value is important since it determines which regions in images will experience high slope function values. A reference gray point value corresponding to an 18% gray scene reflector is chosen since it represents approximately the midpoint of perceptual lightness. Other choices for the value of the reference gray point can also produce excellent results. Reasonable values for the reference gray point range from a 10% scene reflector value to a 25% scene reflector value.

In a first embodiment of the tone scale function generator 230 shown in FIG. 4, either the highlight or the shadow tone scale segment is constructed using a single component function based on exponential functions. The component function used for the highlight tone scale segment is given by the Formula (4)

$$f_{h1}(x)=\beta_{h1}(1-e^{-(x-x_\rho)/\alpha_{h1}})+x_\rho \tag{4}$$

where $x_\rho$ represents the reference gray point, and $\beta_{h1}$ and $\alpha_{h1}$ are numerical constants that determine the shape and slope of the component function $f_{h1}(x)$. The component function used for the shadow tone scale segment is given by the Formula (5)

$$f_{s1}(x)=\beta_{s1}(1-e^{-(x-x_\rho)/\alpha_{s1}})+x_\rho \tag{5}$$

where $\beta_{s1}$ and $\alpha_{s1}$ are numerical constants that similarly determine the shape and slope of the component function $f_{s1}(x)$. If a slope constraint of 1.0 is imposed at the reference gray point, the constants $\beta_{h1}$ and $\beta_{s1}$ are equal to $\alpha_{h1}$ and $\alpha_{s1}$ respectively. For this condition, the equations for the functions $f_{h1}(x)$ and $f_{s1}(x)$ are given as (6) and (7)

$$f_{h1}(x)=\alpha_{h1}(1-e^{-(x-x_\rho)/\alpha_{h1}})+x_\rho \tag{6}$$

$$f_{s1}(x)=\alpha_{s1}(1-e^{-(x-x_\rho)/\alpha_\rho})+x_\rho \tag{7}$$

and the expression for the tone scale function 203 T(x) is given by (8)

$$T(x)=f_{h1}(x) \text{ for } x>=x_\rho \qquad (8)$$

$$T(x)=f_{s1}(x) \text{ for } x<x_\rho$$

The highlight component function is constrained to pass through a specified coordinate point defined by an abscissa value $x_{ho}$ that results in an ordinate value $x_w$ as given by (9).

$$x_w=\alpha_{h1}(1-e^{-(x_{ho}-x_\rho)/\alpha_{h1}})+x_\rho \qquad (9)$$

This constraint achieves a highlight white point mapping objective. For the highlight component function, the white point value $x_w$ is predetermined based on the pixel value that is preferably mapped by the rendering function R(x) to correspond to a photographic paper density of approximately 0.2. With the variables $x_w$ and $x_\rho$ defined, the value of the variable $\alpha_{h1}$ can be solved for a given value of $x_{ho}$ using expression (9) by an iterative numerical solution. Similarly, the shadow component function is constrained to pass through a specified coordinate point defined by an abscissa value $x_{so}$ that results in an ordinate value $x_b$ as given by (10)

$$x_b=\alpha_{s1}(1-e^{-(x_{so}-x_\rho)/\alpha_{s1}})+x_\rho \qquad (10)$$

This constraint achieves a shadow black point mapping objective. For the shadow tone scale function, the black point value $x_w$ is predetermined based on the pixel value that is preferably mapped by the rendering function R(x) to correspond to a photographic paper density of approximately 2.0. With the variables $x_b$ and $x_\rho$ defined, the value of the variable $\alpha_{s1}$ can be solved for a given value of $x_{so}$ using expression (10) by the iterative numerical solution. The iterative numerical solution for expressions (9) and (10) includes a process of first estimating an initial value of $\alpha_{s1}$, calculating each side of the equation, calculating an error term as the difference, inspecting the error, making an adjustment to the estimate of $\alpha_{s1}$, and iterating the procedure until the error term is of an acceptably low magnitude. The iterative solution results are computed for all possible values of $\alpha_{s1}$ and stored in a LUT. The same calculations and procedure are used to determine the value of $\alpha_{h1}$.

Figure 7:
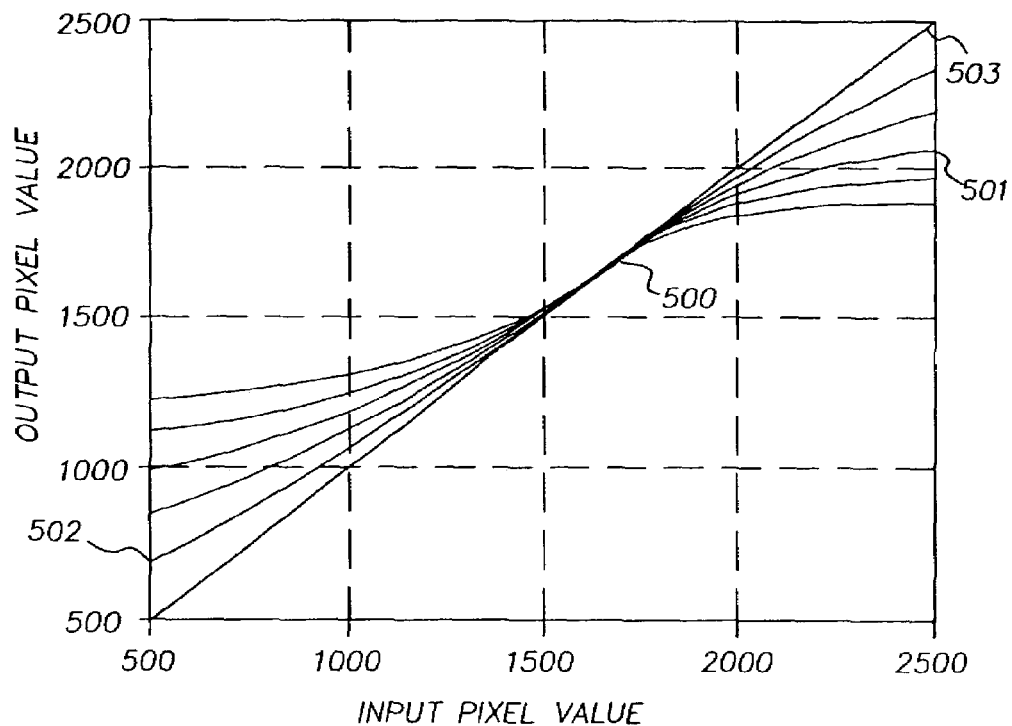
FIG. 7 is a graph illustrating a family of highlight tone scale segments and a family of shadow tone scale segments.

The variables $x_{ho}$ and $x_{so}$ are control variables in the expressions (9) and (10) that, once selected, determine the function shape and slope characteristics for expressions (6) and (7). FIG. 7 shows a graph depicting a family of curves that represent highlight tone scale segments generated with different values of $x_{ho}$ and a family of curves that represent shadow tone scale segments generated with different values of $x_{so}$. Point 500 represents the reference gray point $x_\rho$. Curve 501 represents a highlight tone scale segment constructed from one highlight component function. Curve 502 represents a shadow tone scale segment constructed from one shadow component function. Line 503 represents the one-to-one input-to-output line. For each of the highlight tone scale segments shown in FIG. 7, the highlight component function graphed has a monotonically decreasing instantaneous slope value. Similarly, for each of the shadow tone scale segments shown in FIG. 7, the component function graphed has a monotonically increasing instantaneous slope value. The variables $x_{ho}$ and $x_{so}$ can be selected independently. Thus, the shape of the two tone scale segments can be controlled independent from one another.

The expressions (6) and (7) were derived with the constraint that the slope function (corresponding to the component function), when evaluated at the reference gray point, must be equal to 1.0. In another embodiment, exponential functions are used in similar fashion with a slope constraint imposed. The slope of the highlight component function must be equal to a selected value $\phi_h$ and the shadow component function must be equal to a selected value $\phi_s$. For this embodiment, the imposed slope constraint results in a relationship between the variables $\beta_{h1}$ and $\alpha_{h1}$ in expression (4) and $\beta_{s1}$ and $\alpha_{s1}$ in expression (5) given by expressions (11) and (12) respectively.

$$\beta_{h1}=\phi_h\alpha_{h1} \qquad (11)$$

$$\beta_{s1}=\phi_s\alpha_{s1} \qquad (12)$$

The expressions for the highlight component function and the shadow component function are given by expressions (13) and (14) respectively.

$$f_{h1}(x)=\phi_h\alpha_{h1}(1-e^{-(x-x_\rho)/\alpha_{h1}})+x_\rho \qquad (13)$$

$$f_{s1}(x)=\phi_s\alpha_{s1}(1-e^{-(x-x_\rho)/\alpha_{s1}})+x_\rho \qquad (14)$$

The first derivative functions that represent the slope function of the highlight and shadow component functions are given by expressions (15) and (16) respectively.

$$f_{h1}'(x)=\phi_h e^{-(x-x_\rho)/\alpha_{h1}} \qquad (15)$$

$$f_{s1}'(x)=\phi_s e^{-(x-x_\rho)/\alpha_{s1}} \qquad (16)$$

If the value of $x_{ho}$ is greater than the value of $x_w$, the highlight component function will map a greater range of input pixel values to a lesser range of output pixel values and is therefore considered a compressive function. Conversely, if the value of $x_{ho}$ is less than the value of $x_w$, the highlight component function will map a lesser range of pixel values to a greater range of pixel values and is therefore considered an expansive function. Similarly, if the value of $x_{so}$ is less than the value of $x_b$, the shadow component function will map a greater range of input pixel values to a lesser range of output pixels value and is therefore considered a compressive function. Conversely, if the value of $x_{so}$ is greater than the value of $x_b$, the shadow component function will map a lesser range of pixel values to a greater range of pixel values and is therefore considered an expansive function. Therefore, based on the values of the variables $x_{ho}$ and $x_w$, the highlight tone scale segment can be classified as compressive, expansive, or neutral. When the value $x_{ho}$ is equal to the value of $x_w$, the highlight tone scale segment is classified as neutral since for this unique condition the highlight tone scale segment assumes the identity mapping function. Based on the values of the variables $x_{so}$ and $x_b$, the shadow tone scale segment can be classified as compressive, expansive, or neutral. Similarly, when the value $x_{so}$ is equal to the value of $x_b$, the shadow tone scale segment is classified as neutral since for this unique condition the shadow tone scale segment assumes the identity mapping function.

For compressive highlight component functions, the numerical constant $\alpha_{h1}$ is positive. The corresponding slope function of the highlight component function given by expression (15) for positive values of $\phi_h$ yields positive slope function values for all x values greater than or equal to the reference gray point $x_\rho$. The expression for the second derivative function, or the slope function of the slope function of the highlight component function is given by expression (17)

$$f_{h1}''(x)=-(\phi_h/\alpha_{h1})e^{-(x-x_\rho)/\alpha_{h1}} \qquad (17)$$

Figure 8A:
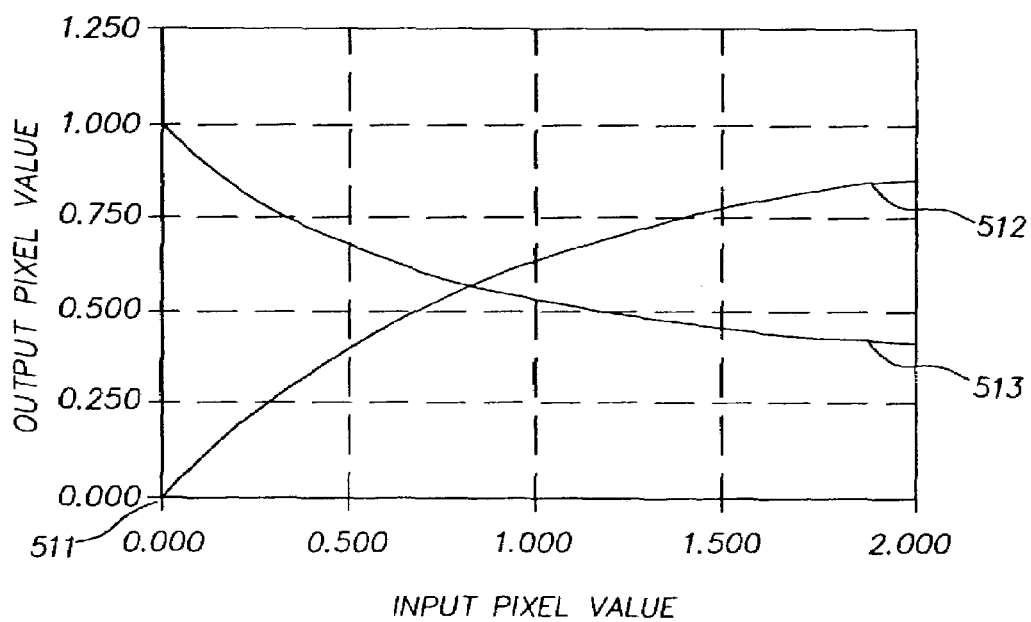
FIG. 8a is a graph of an example of a compressive highlight component function and its corresponding slope function.

FIG. 8a shows an example graph of a highlight tone scale segment generated with a $\phi_h$ variable set to 1.0, a reference gray point set to 0.0 and $\alpha_{h1}$ variable set to 1.0. As can be seen by inspection of the graph shown in FIG. 8a and by expression (17), positive values of $\alpha_{h1}$ and $\phi_h$ result in a compressive highlight tone scale segment with a monotonically decreasing slope function that assumes values that are greater than or equal to zero. Curve 512 depicts such a highlight component function used to construct a highlight tone scale segment and curve 513 depicts its corresponding slope function. The reference gray point is indicated by point 511.

Similarly, for compressive shadow component functions, the numerical constant $\alpha_{s1}$ is negative. The corresponding slope function of the shadow component function given by expression (16) for the positive values of $\phi_s$ yields positive slope values for all x values less than or equal to the reference gray point $x_\rho$. The expression for the second derivative function, or slope function of the slope function of the shadow component function is given by expression (18)

$$f_{s1}''(x) = (\phi_s/\alpha_{s1})e^{-(x-x_\rho)/\alpha_{s1}} \qquad (18)$$

Figure 8B:
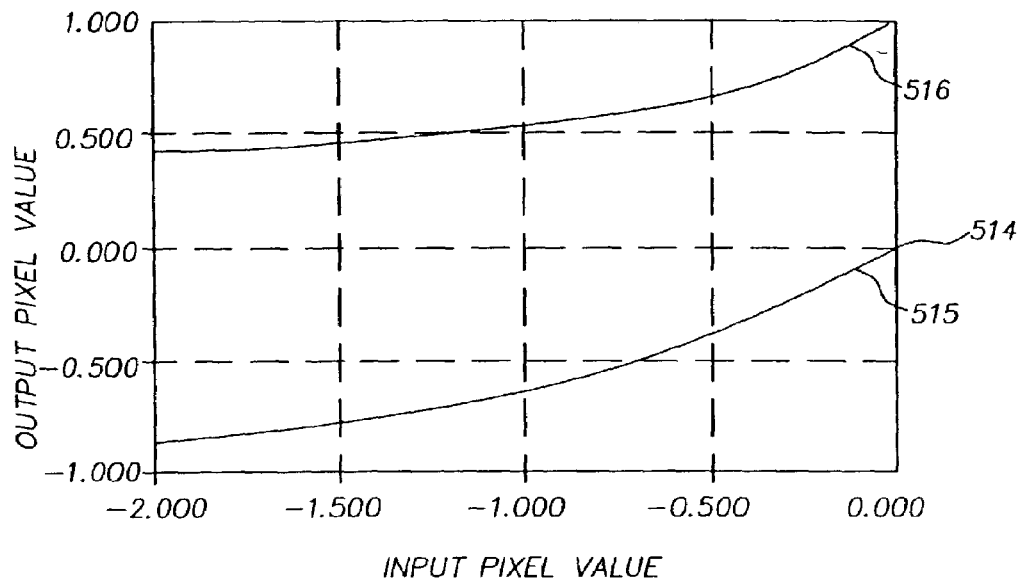
FIG. 8b is a graph of an example of a compressive shadow component function and its corresponding slope function.

FIG. 8b shows an example graph of a shadow tone scale segment generated with a $\phi_s$ variable set to 1.0, a reference gray point set to 0.0 and a $\alpha_{s1}$ variable set to 1.0. As can be seen by inspection of the graph shown in FIG. 8b and by expression (18), positive values of $\alpha_{s1}$ and $\phi_s$ result in a compressive shadow tone scale segment with a monotonically increasing slope function that assumes values that are greater than or equal to zero. Curve 515 depicts such a shadow component function used to construct a shadow tone scale segment and curve 516 depicts its corresponding slope function. The reference gray point is indicated by point 514.

Figure 8C:
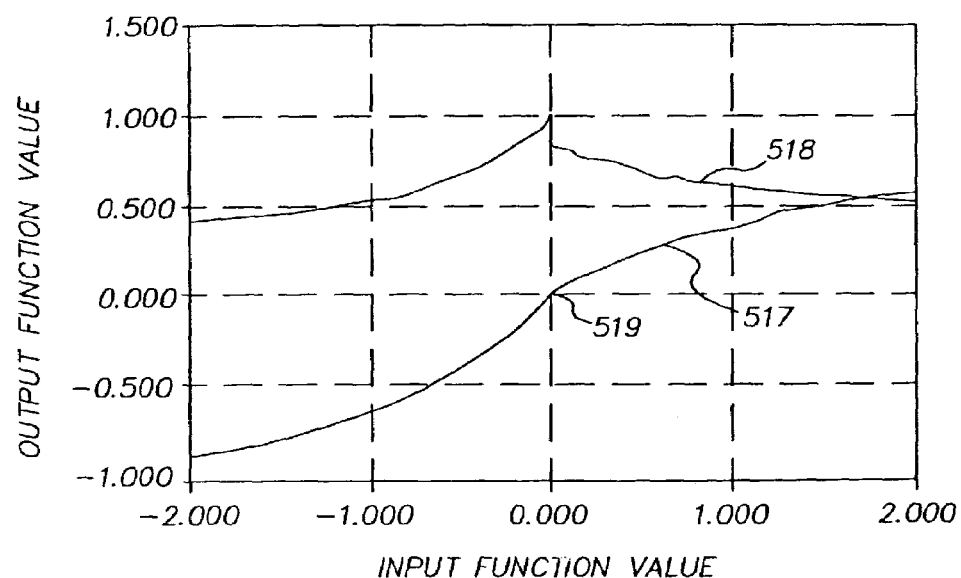
FIG. 8c is a graph of an example of a tone scale function constructed from a compressive highlight and shadow tone scale segment and its corresponding slope function.

An example tone scale function 203, shown in FIG. 8c, was constructed from a highlight and shadow tone scale segment, each of which is constructed from a single component function as described above. The equal slope condition, as described above, is not a requirement of the tone scale functions generated by the present invention. In the example tone scale function shown in FIG. 8c, the slopes of the highlight and shadow tone scale segments are not equal when evaluated at the reference gray point. Curve 517 represents the tone scale function 203 and curve 518 its corresponding slope function. The reference gray point is indicated by point 519. As can be seen in the example graph shown in FIG. 8c, the tone scale function has a discontinuity in the slope function at the reference gray point. Tone scale functions having continuous slope function are, in general, desirable. However, experimentation has shown that the discontinuity in the slope function of a tone scale function when applied to digital images relating to natural photographed scenes is not often a problem. Other methods for generating tone scale functions, such as described in commonly assigned U.S. Pat. No. 6,285,798 have imposed a continuity of slope constraint on the process of construction. The experimentation performed in support of the present invention has found that the continuity of slope constraint can be unnecessarily restrictive for some digital imaging applications. By not imposing the continuity of slope constraint, a greater diversity of useful tone scale functions can be produced. In particular, tone scale functions that are constructed in a manner responsive to the pixels of the source digital image when applied to the source digital image can achieve a greater level of overall contrast enhancement.

In another embodiment, the highlight tone scale segment is constructed from a compressive highlight component function. Recall that for compressive highlight component functions $x_{ho}$ is greater than $x_w$. For this embodiment, the expression given by (6) is combined with a linear function, which relaxes the function's slope condition at the reference gray point. The expression for the highlight component function is given by (19)

$$f_{h1}(x) = (1-\phi_{HC})\alpha_{h1}(1-e^{-(x-x_\rho)/\alpha_{h1}}) + \phi_{HC}\gamma_{HC}(x-x_\rho) + x_\rho \qquad (19)$$

where the variable $\gamma_{HC}$ represents the average slope for the function over the interval from $x_\rho$ to $x_{ho}$ and is given by expression (20)

$$\gamma_{HC} = (x_w - x_\rho)/(x_{ho} - x_\rho) \qquad (20)$$

The variable $\phi_{HC}$ determines the contribution of the linear function to the highlight component function. The variable $\phi_{HC}$ can be selected to affect a change in the shape of the highlight tone scale segments that uses expression (19) as a highlight component function. If $\phi_{HC}$ is set to 0.0, expression (19) reverts to expression (6). If $\phi_{HC}$ is set to 1.0, the expression (19) assumes a linear function given by expression (21)

$$f_{h1}(x) = \gamma_{HC}(x-x_\rho) + x_\rho \qquad (21)$$

Thus, the variable $\phi_{HC}$ is a control parameter that can be used to select the degree to which the highlight component function behaves as a pure exponential function. Similarly, the expression for the shadow component function is given by (22)

$$f_{s1}(x) = (1-\phi_{SC})\alpha_{s1}(1-e^{-(x-x_\rho)/\alpha_{s1}}) + \phi_{SC}\gamma_{SC}(x-x_\rho) + x_\rho \qquad (22)$$

where the variable $\gamma_{SC}$ represents the average slope for the function over the interval from $x_{so}$ to $x_\rho$ and is given by expression (23)

$$\gamma_{SC} = (x_b - x_\rho)/(x_{so} - x_\rho) \qquad (23)$$

The variable $\phi_{SC}$ can be selected to change the shape of the shadow tone scale segments that use expression (22) as a shadow component function. If $\phi_{SC}$ is set to 0.0, expression (22) reverts to expression (7). If $\phi_{SC}$ is set to 1.0, expression (22) assumes a linear function given by expression (24)

$$f_{s1}(x) = \gamma_{SC}(x-x_\rho) + x_\rho \qquad (24)$$

Thus, the variable $\phi_{SC}$ is a control parameter that can be used to select the degree to which the shadow component function behaves as a pure exponential function.

Figure 9:
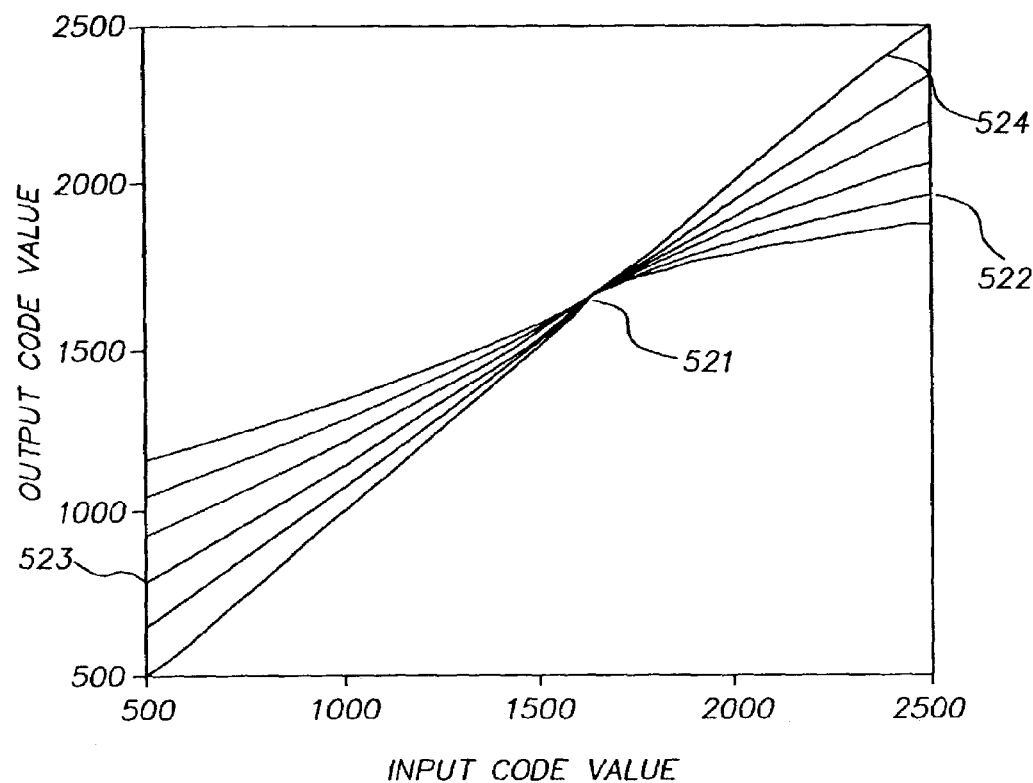
FIG. 9 is a graph illustrating a family of highlight tone scale segments and a family of shadow tone scale segments constructed.

Changing the $\phi_{HC}$ and $\phi_{SC}$ variables can have a significant impact on the appearance of the processed digital images. Setting the $\phi_{HC}$ and $\phi_{SC}$ variables toward 0.0 results in processed digital images that have a more traditional photographic high contrast appearance. Conversely, setting the $\phi_{HC}$ and $\phi_{SC}$ variables toward 1.0 results in processed digital images that have a more professional photographic low contrast appearance more appropriate for portraiture. FIG. 9 shows a graph depicting a family of curves that represent highlight tone scale segments generated with expression (19) using different values of $x_{ho}$ and a family of curves that represent shadow tone scale segments generated with expression (22) using different values of $x_{so}$. Point 521 represents the reference gray point $x_\rho$. Curve 522 represents a highlight tone scale segment constructed from one highlight component function. Curve 523 represents a shadow tone scale segment constructed from one shadow component function. Line 524 represents the identity mapping one-to-one input pixel value-to-output pixel value line. The tone scale function 203 can be constructed from any of the highlight tone scale segments depicted in FIG. 9 or any of the shadow tone scale segments since the variables $x_{ho}$ and $x_{so}$ can be selected independently. It should also be noted that if the variables $\phi_{HC}$ and $\phi_{SC}$ are not set to 0.0, the resultant tone scale function will, in general, not have a continuous slope function at the reference gray point.

A highlight component function constructed with expressions (4), (6), or (13), for the case in which $x_{ho}$ is less than $x_w$, will result in a function that has a montonically increasing instantaneous slope. An example of such a function is depicted as curve 530 in FIG. 10a. While the function indicated by curve 530 satisfies the mapping of input pixel value $x_{ho}$ to output pixel value $x_w$, a tone scale function based on such a function can produce some unnatural looking images. This is mainly due to the fact that the slope of the highlight component function depicted by curve 530 has a slope that is monotonically increasing, not monotonically decreasing, for the input pixel range near the reference gray point. However, a highlight component function can be constructed using the expressions (4), (6), or (13), reflected about the line indicated as line 531 given by (25) for input pixel values greater than or equal to the reference gray point (indicated by point 533).

$$y(x)=(x_w-x_\rho)/(x_{ho}-x_\rho)(x-x_\rho)+x_\rho \quad (25)$$

Figure 10A:
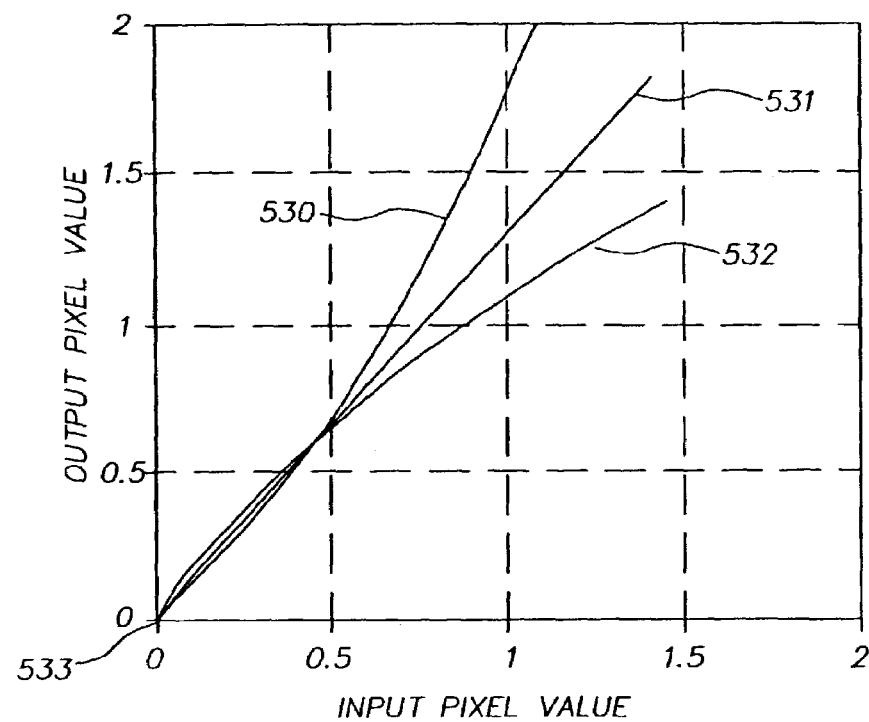
FIG. 10a is a graph illustrating the construction details of an expansive highlight component function.

The function produced by the reflection process, as indicated by curve 532 in FIG. 10a, is a monotonically increasing function with a monotonically decreasing instantaneous slope. The functional form of the expansive highlight component function is calculated by the following steps. First the expression (4), (6), or (13) is solved using the constraint $x_{ho}=x_w$ to determine the numerical constant $\alpha_{h1}$. In the second step, a first rotation transform is applied to a coordinate pair $(x,f(x))$ resulting in a transformed coordinate pair $(u,v)$ as given by (26)

$$u=x\cos(\theta)+f(x)\sin(\theta)$$
$$v=-x\sin(\theta)-f(x)\cos(\theta) \quad (26)$$

where the angle $\theta$ is given by (27)

$$\theta=\tan^{-1}((x_w-x_\rho)/(x_{ho}-x_\rho)) \quad (27)$$

The first rotation transform is designed to transform the line described by expression (24) into the x-axis. In the third step the v coordinate is reflected about the new x-axis by taking the negative of the value v coordinate. In the fourth step, a reverse rotation transform is applied to the coordinate pair (u, −v) for the coordinate pair (u',v') as given by (28)

$$u'=u\cos(\theta)+v\sin(\theta)$$
$$v'=x\sin(\theta)-v\cos(\theta) \quad (28)$$

In the fifth step, the coordinate pair (u',v') defines a highlight component function g(u) and is evaluated for the range of input pixel values.

Figure 10B:
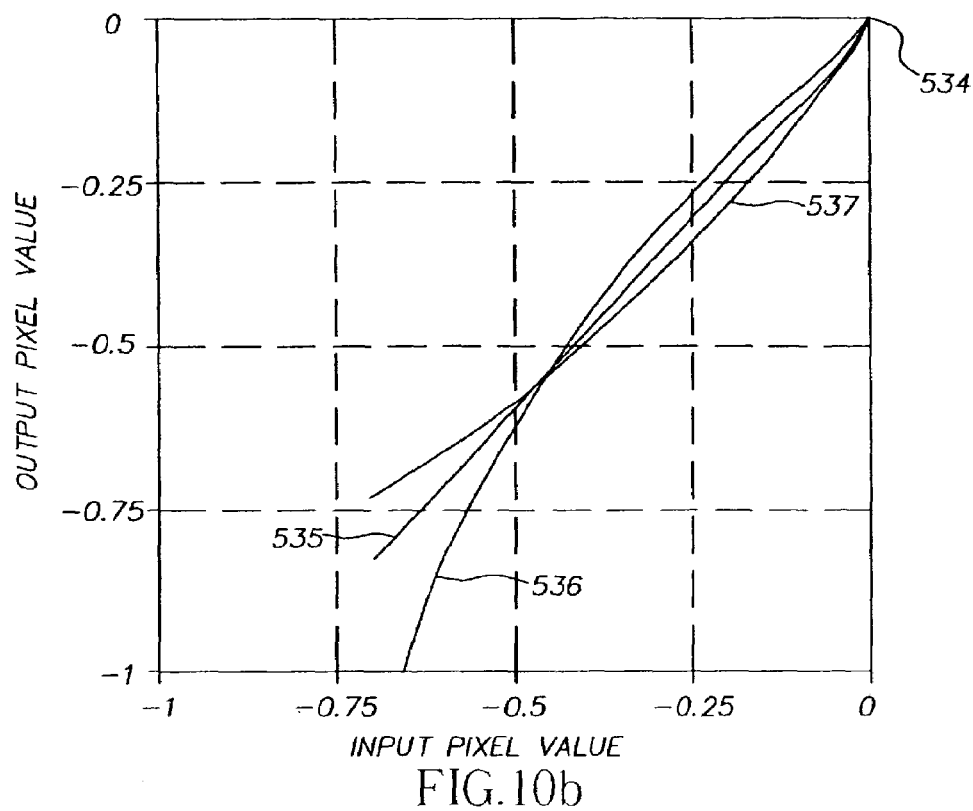
FIG. 10b is a graph illustrating the construction details of an expansive shadow component function.

Referring to FIG. 10b, an expansive shadow component function can be constructed in similar manner as described above for the case in which $x_{so}>x_b$. The shadow component function can be constructed using the function described by (5), (7), or (14), reflected about the line indicated as line 535 given by (29) for input pixel values less than or equal to the reference gray point (indicated by point 534) using the constraint $x_{so}=x_b$ to determine the numerical constant $\alpha_{s1}$.

$$y(x)=(x_b-x_\rho)/(x_{so}-x_\rho)(x-x_\rho)+x_\rho \quad (29)$$

The curve indicated by 536 depicted in FIG. 10b shows a function using (5), (7), or (14) for a positive numerical constant $\alpha_{s1}$. The corresponding expansive shadow component function produced via the reflection processing steps is indicated by curve 537.

Figure 10C:
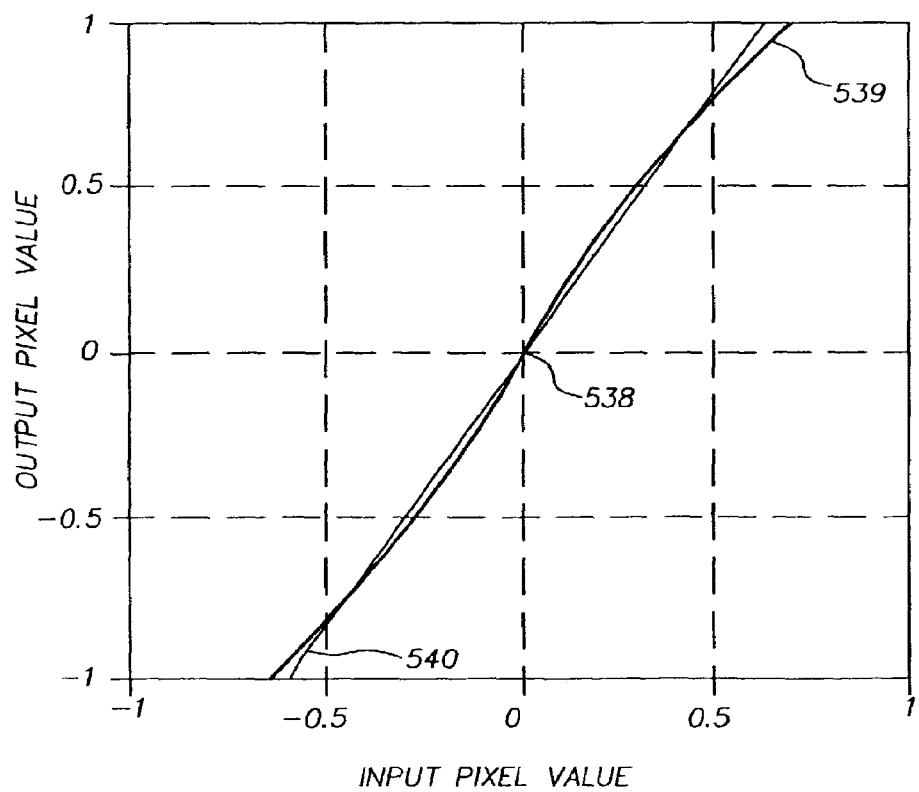
FIG. 10c is a graph of an example of a tone scale function constructed from an expansive highlight and shadow tone scale segment and its corresponding slope function.

An example graph of a tone scale function constructed from an expansive highlight tone scale segment and an expansive shadow tone scale segment constructed with the component functions described above is shown in FIG. 10c. Since both the highlight and shadow tone scale segments are expansive, the tone scale function, indicated by curve 539, is classified as an expansive function over the range of input pixel values from $x_{so}$ to $x_{ho}$. The combined linear functions given by expressions (25) and (29) are shown as line 540 with the reference gray point as indicated by point 538. The tone scale function depicted in FIG. 8c as curve 517 is classified as a compressive function over the range of input pixel values from $x_{so}$ to $x_{ho}$ since both the highlight and shadow tone scale segments used in its construction are compressive component functions. The reference gray point is indicated by point 538.

In a preferred embodiment, the expansive highlight component function $f_{h1}(x)$ is constructed using the expression (4) subject the constraints given by (30) and (31)

$$f_{h1}(x_{ho}')=x_w \quad (30)$$

$$f_{h1}'(x_w)=1.0 \quad (31)$$

where the variable $x_{ho}'$ is given by the expression (32)

$$f_{h1}(x_{ho}')=(1.0-\eta_H)(x_w-x_{ho})+x_{ho} \quad (32)$$

and the variable $\eta_H$ represents a control parameter that can be used to select the shape of the function. With these two constraints placed on the function $f_{h1}(x)$, the highlight component function achieves the goal of mapping the prescribed input pixel value $x_{ho}'$ to the prescribed output pixel value $x_w$. The average slope of the function $\gamma_{HE}$ over the interval from $x_\rho$ to $x_{ho}'$ is given by the expression (33)

$$\gamma_{HE}=(x_w-x_\rho)/(x_{ho}'-x_\rho) \quad (33)$$

which is greater than 1.0 since $x_w$ is greater than $x_{ho}'$. In a similar manner as described above, the variables $\alpha_{h1}$ and $\beta_{h1}$ used in the expression (4) are solved by iterative numerical approximation and stored in a LUT for later recall. The variable $\eta_H$ is preferably set to 0.5. As a further refinement, the highlight component function is combined with a linear function using a control parameter $\phi_{HE}$. The final expression for the expansive highlight component function is given by (34)

$$f_{h1}(x)=(1-\phi_{HE})\alpha_{h1}(1-e^{-(x-x_\rho)/\alpha_{h1}})+\phi_{HE}\gamma_{HE}+x_\rho \quad (34)$$

Similarly, the expansive shadow component function $f_{s1}(x)$ is constructed using the expression (5) subject the constraints given by (35) and (36)

$$f_{s1}(x_{so}')=x_b \quad (35)$$

$$f_{s1}'(x_b)=1.0 \quad (36)$$

where the variable $x_{so}'$ is given by the expression (37)

$$f_{s1}(x_{so}')=(1.0-\eta_S)(x_b-x_{so})+x_{so} \quad (37)$$

and the variable $\eta_S$ represents a control parameter that can be used to select the shape of the function. With these two constraints placed on the functions $f_{s1}(x)$, the shadow component function achieves the goal of mapping the prescribed input pixel value $x_{so}'$ to the prescribed output pixel value $x_b$.

The average slope of the function $\gamma_{SE}$ over the interval from $x_{so}'$ to $x_\rho$ is given by the expression (38)

$$\gamma_{SE}(x_\rho-x_b)/(x_\rho-x_{so}') \quad (38)$$

which is greater than 1.0 since $x_b$ is less than $x_{so}'$. In a similar manner as described above, the variables $\alpha_{s1}$ and $\beta_{s1}$ used in the expression (5) are solved by iterative numerical approximation and stored in a look-up-table (LUT) for later recall. The variable $\eta_S$ is preferably set to 0.5. As a further refinement, the shadow component function is combined with a linear function using a control variable $\phi_{SE}$. The final expression for the expansive shadow component function is given by (39)

$$f_{s1}(x)=(1-\phi_{SE})\alpha_{s1}(1-e^{-(x-x_\rho)/\alpha_{s1}})+\phi_{SE}\gamma_{SE}+x_\rho \quad (39)$$

Figure 11:
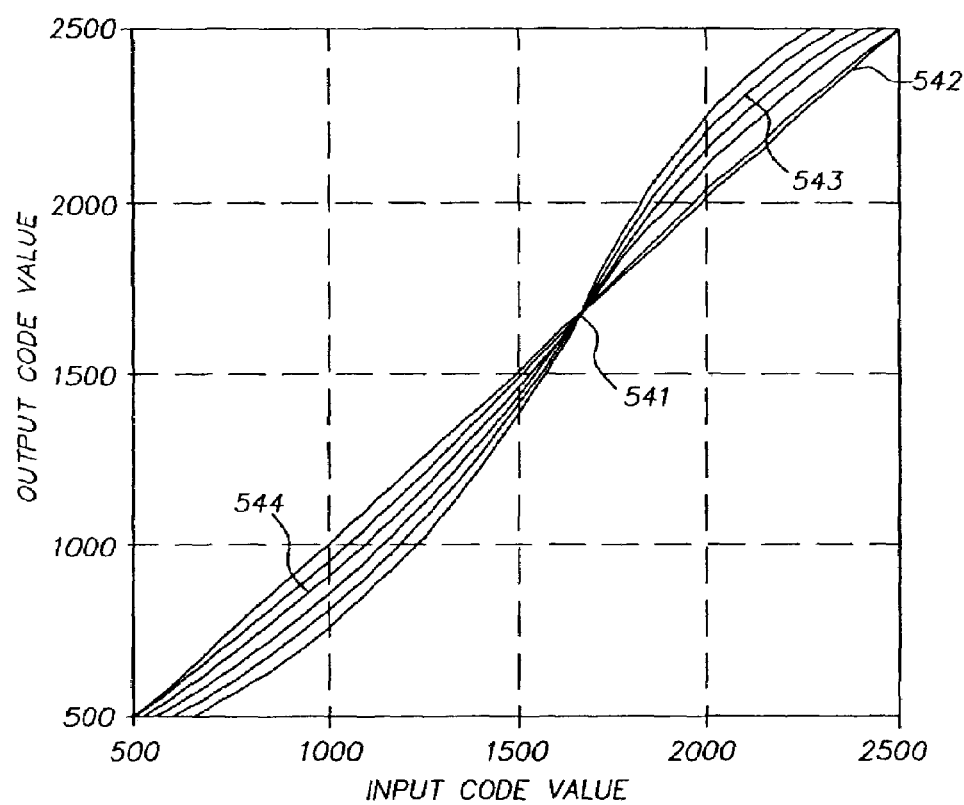
FIG. 11 is a graph illustrating a family of highlight tone scale segments and a family of shadow tone scale segments.

FIG. 11 depicts a family of highlight and shadow tone scale segments each generated from a single expansive component function using expressions (34) and (39) respectively. Point 541 represents the reference gray point $x_\rho$. Line 542 represents the identity mapping one-to-one input pixel value-to-output pixel value line. Curve 543 represents an example a highlight tone scale segment using expression (34). Curve 544 represents an example shadow tone scale segment using expression (39).

Figure 12A:
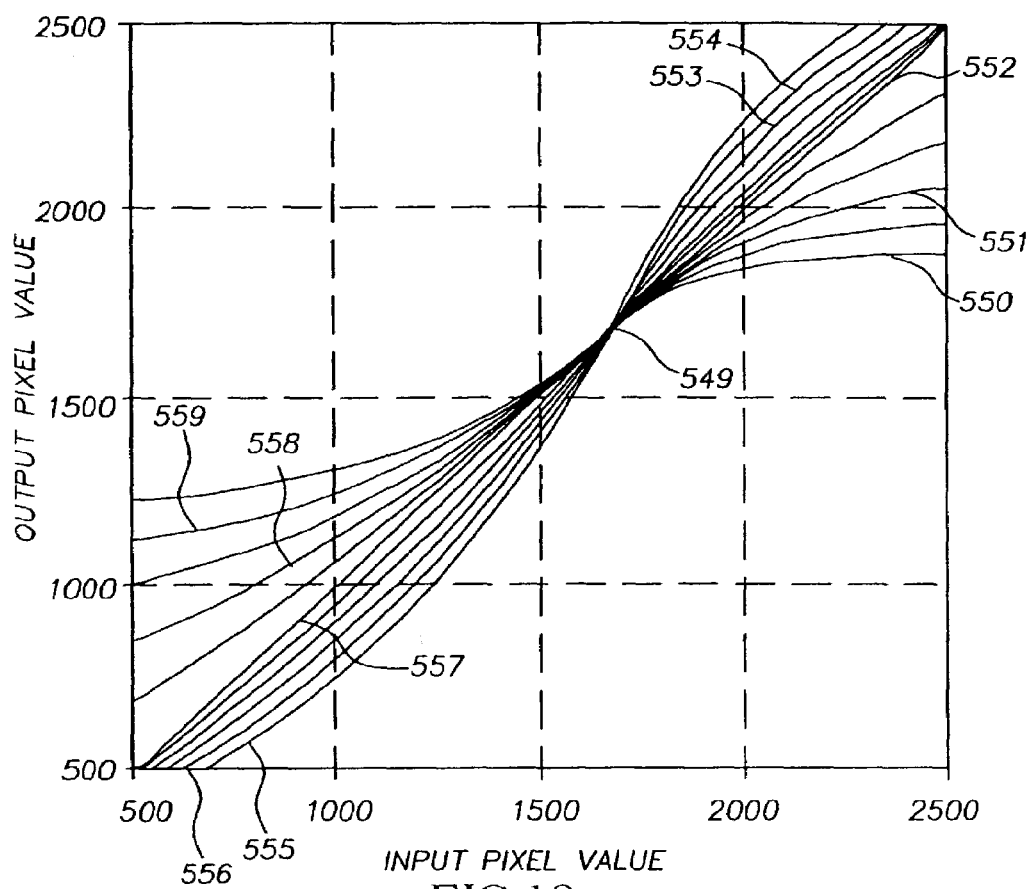
FIG. 12a is a graph illustrating a family of highlight tone scale segments and a family of shadow tone scale segments for both compressive and expansive type functions.
Figure 13:
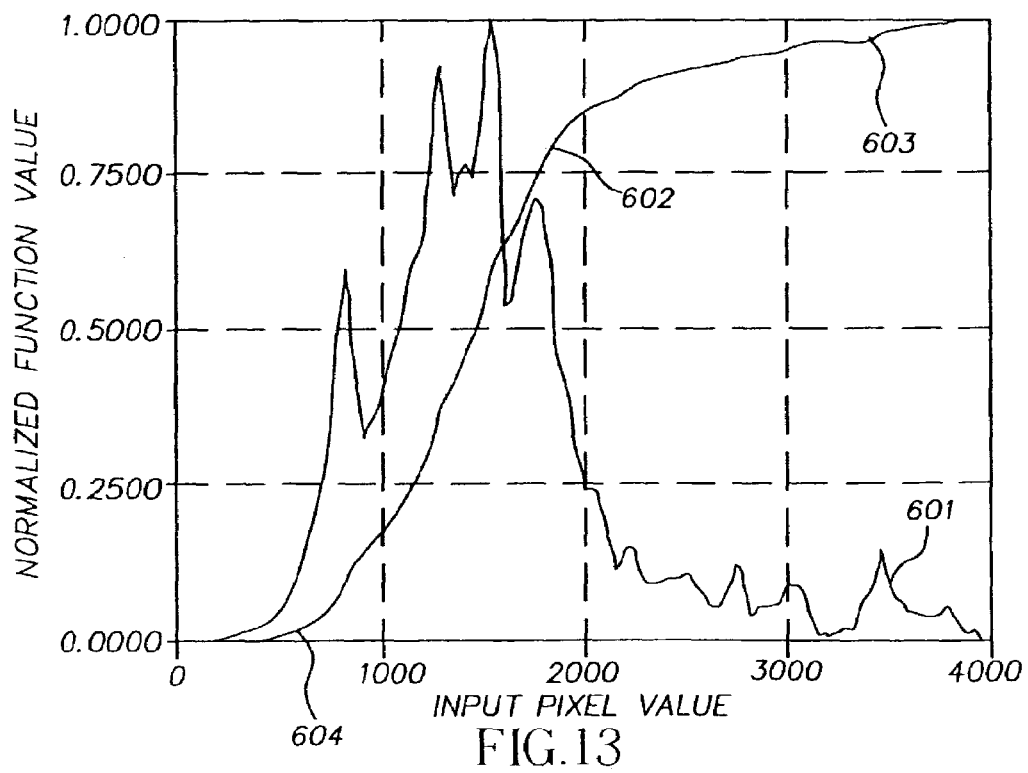
FIG. 13 is a graph illustrating an example image histogram function and its corresponding cumulative histogram function.

An important feature of the tone scale segments constructed with the two-segment method is the gradual transition in function shape corresponding to a transition from compressive to expansive type functions. FIG. 12a depicts a family of highlight tone scale segments constructed from a single highlight component function using expression (19) when the component function is compressive and expression (34) when the component function is expansive. Point 549 indicates the reference gray point. Curve 550 indicates a highly compressive highlight component function while curve 551 indicates a mildly highlight component function. The higher the degree of compression, the greater the curvature of the function. When the highlight component function is neither compressive nor expansive, the function assumes the identity mapping one-to-one input-to-output line indicated by line 552. Curve 553 indicates a mildly expansive highlight component function. Curve 554 indicates a highly expansive highlight component function. The higher the degree of expansion, the greater the curvature of the function. Thus, for mildly compressive and mildly expansive highlight component functions, the shape of the function is closer to a straight line. For the compressive highlight component functions used to construct the highlight component segments as shown in FIG. 12a a value of 0.0 was used for the variable $\phi_{HC}$. For the expansive highlight component functions used to construct the highlight component segments shown in FIG. 12a a value of 0.0 was used for the variable $\phi_{HE}$. It should be noted that the value of the $\phi_{HC}$ variable used in expression (19) can be selected independent of the value of the $\phi_{HE}$ variable used in expression (34).

The shape of the shadow tone scale segments also have a graceful transition between compressive and expansive function types. FIG. 12a also depicts a family of shadow tone scale segments constructed from a single shadow component function using expression (22) when the component function is compressive and expression (39) when the component function is expansive. Curve 555 indicates a highly compressive shadow component function while curve 556 indicates a mildly shadow component function. The higher the degree of compression, the greater the curvature of the function. When the shadow component function is neither compressive nor expansive, the function assumes the identity mapping one-to-one input-to-output line indicated by line 557. Curve 558 indicates a mildly expansive shadow component function. Curve 559 indicates a highly expansive shadow component function. The higher the degree of expansion, the greater the curvature of the function. Thus, for mildly compressive and mildly expansive shadow component functions, the shape of the function is closer to a straight line. For the compressive shadow component functions used to construct the shadow component segments as shown in FIG. 12a a value of 0.0 was used for the variable $\phi_{SC}$. For the expansive shadow component functions used to construct the shadow component segments shown in FIG. 12a a value of 0.0 was used for the variable $\phi_{SE}$. It should be noted that the value of the $\phi_{SC}$ variable used in expression (22) can be selected independent of the value of the $\phi_{SE}$ variable used in expression (39).

Figure 12B:
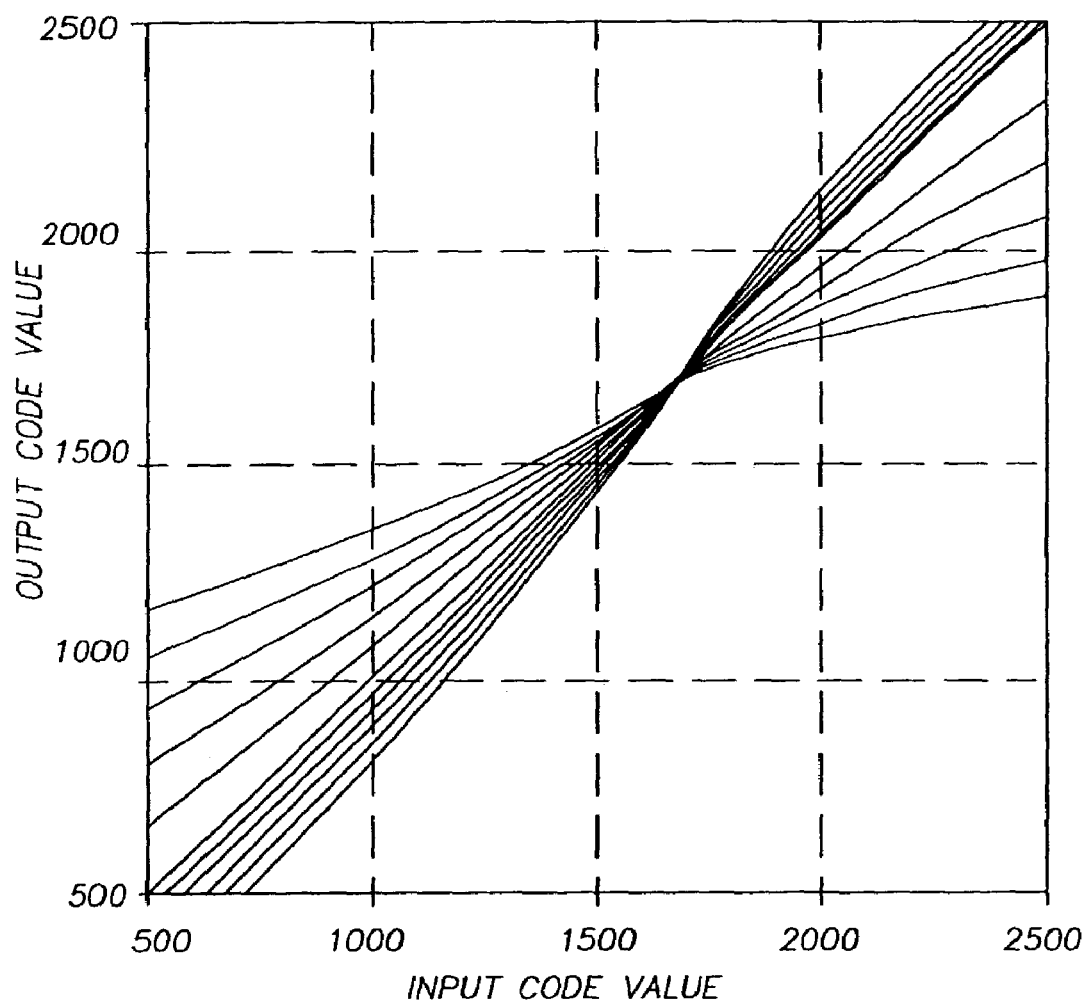
FIG. 12b is another graph illustrating a family of highlight tone scale segments and a family of shadow tone scale segments for both compressive and expansive type functions.

FIG. 12b depicts a similar family of highlight and shadow tone scale segments constructed using expressions (19), (34), (22) and (39) with the values of the variables $\phi_{HC}$, $\phi_{HE}$, $\phi_{SC}$, and $\phi_{SE}$ all set to a value of 0.5. As can be seen from the curves depicted in FIG. 12b, the tone scale segments make a gradual transition in function shape for a corresponding transition from compressive to expansive type functions.

In another construction method for a compressive highlight component function, the variable $\phi_h$ is made a function of the degree of compression, i.e. the ratio of $(x_w-x_\rho)$ to $(x_{ho}-x_\rho)$. The expression for the highlight component function $f_{h1}(x)$ is given by (13) where the slope variable $\phi_h$ in expression (13) is given by (40)

$$\phi_h=1.0-\eta_h(1.0-(x_w/x_{ho})) \quad (40)$$

and the variable $\eta_h$ controls the shape of the highlight component function. The variable $\eta_h$ can be selected. When the variable $\eta_h$ is set to 1.0, the highlight component function assumes the equation of a line given as expression (21). When the variable $\eta_h$ is set to 0.0, the highlight component function assumes the equation of the exponential function given as expression (13). Similarly, for a compressive shadow component function, the variable $\phi_s$ is made a function of the degree of compression, i.e. the ratio of $(x_\rho-x_b)$ to $(x_\rho-x_{so})$. The expression for the shadow component function $f_{s1}(x)$ is given by (14) where the slope variable $\phi_s$ in expression (14) is given by (41)

$$\phi_s=1.0-\eta_s(1.0-(x_b/x_{so})) \quad (41)$$

and the variable $\eta_s$ controls the shape of the shadow component function. When the variable $\eta_s$ is set to 1.0, the shadow component function assumes the equation of a line given as expression (24). When the variable $\eta_s$ is set to 0.0, the shadow component function assumes the equation of the exponential function given as expression (14).

Referring to FIG. 4, the pixels of the source digital image, i.e. the input digital image to the tone scale module 330, can be used to determine the variables $x_{ho}$ and $x_{so}$ and thus determine the shape of the tone scale function. The analysis image generator 250 receives the source digital image and produces an analysis digital image 201 by applying a low-pass spatial filter and performing a sampling operation. The result is a lower spatial resolution version of the source digital image that has fewer pixels representing the same image content. Typical spatial resolutions for the analysis digital image 201 is approximately 64 by 96 pixels. The analysis digital image is also converted to be in a luminance-chrominance representation using expression (2).

The tone scale function generator 230 calculates the tone scale function 203 by analyzing the pixels of the analysis digital image 201. A pixel histogram function, i.e. a frequency of occurrence function, is calculated from the pixels of the luminance digital image channel of the analysis digital image 201. A cumulative histogram function is calculated from the pixel histogram function by integrating the values of the pixel histogram as a function of pixel value. FIG. 14 shows a graph of an example histogram function indicated by curve 601 and its corresponding cumulative histogram function indicated by curve 602. The cumulative histogram function is scaled between 0.0 and 1.0 and relates to the percentage area of the digital image with 1.0 corresponding to 100 percent of image area. The ordinate value of the cumulative histogram function relates to a given percentage image area Z. The corresponding abscissa value relates to the pixel value P for which the percentage of pixels in the image that have values less than P is given by Z. The 99.0% cumulative histogram function value is used to determine the value of the highlight point, variable $x_{ho}$. The 1.0% cumulative histogram function value is used to determine the value of the shadow point, variable $x_{so}$. The values for the variables $x_{ho}$ and $x_{so}$ are indicated as points 603 and 604 respectively on the graph shown in FIG. 14.

Referring to FIG. 3 and FIG. 4, the tone scale function generator 230 can accept user input selections 231 in the generation of the tone scale function 203. For example a user of the system shown in FIG. 1 can view possible selections and/or control parameters on the monitor device 50 and indicate selections using the input control device 60 such as a keyboard or mouse pointing device. When used in this manual user mode, a highlight control parameter and a shadow control parameter are used to change the shape of the component functions that are used to generate the highlight tone scale segment and shadow tone scale segment, respectively.

The present invention is preferably practiced in an image processing system including a source of digital images, such as a scanner, a computer programmed to process digital images, and an output device such as a thermal or ink-jet printer. The method of the present invention may be sold as a computer program product including a computer readable storage medium bearing computer code for implementing the steps of the invention.

Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

| | |
|---|---|
| 10 | image capture device |
| 10a | image capture device |
| 10b | image capture device |
| 10c | image capture device |
| 20 | digital image processor |
| 30a | image output device |
| 30b | image output device |
| 40 | general control computer |

-continued
PARTS LIST

| | |
|---|---|
| 50 | monitor device |
| 60 | input control device |
| 70 | computer memory device |
| 101 | original digital image |
| 102 | source digital image |
| 103 | rendered digital image |
| 104 | enhanced digital image |
| 107 | luminance digital image |
| 109 | chrominance digital image |
| 113 | enhanced luminance digital image |
| 114 | enhanced chrominance digital image |
| 201 | analysis digital image |
| 203 | tone scale function |
| 210 | LCC conversion module |
| 220 | RGB conversion module |
| 230 | tone scale function generator |
| 231 | user input selections |
| 240 | tone scale function applicator |
| 241 | tone scale function classifier |
| 242 | compressive function applicator |
| 243 | mixed function applicator |
| 244 | expansive function applicator |
| 250 | analysis image generator |
| 310 | RLSE conversion module |
| 320 | scene balance module |
| 330 | tone scale module |
| 340 | rendering module |
| 401 | input digital image |
| 402 | texture digital image |
| 403 | pedestal digital image |
| 405 | enhanced texture digital image |
| 407 | tone scale adjusted digital image |
| 409 | output digital image |
| 410 | pedestal generation module |
| 420 | difference module |
| 430 | tone scale modifier |
| 432 | chrominance modifier |
| 440 | addition module |
| 500 | point |
| 501 | curve |
| 502 | curve |
| 503 | line |
| 511 | point |
| 512 | curve |
| 513 | curve |
| 514 | point |
| 515 | curve |
| 516 | curve |
| 517 | curve |
| 518 | curve |
| 519 | point |
| 521 | point |
| 522 | curve |
| 523 | curve |
| 524 | line |
| 530 | curve |
| 531 | line |
| 532 | curve |
| 533 | point |
| 534 | point |
| 535 | line |
| 536 | curve |
| 537 | curve |
| 538 | point |
| 539 | curve |
| 540 | line |
| 541 | point |
| 542 | line |
| 543 | curve |
| 544 | curve |
| 549 | point |
| 550 | curve |
| 551 | curve |
| 552 | line |
| 553 | curve |
| 554 | curve |
| 555 | curve |

-continued

| PARTS LIST | |
|---|---|
| 556 | curve |
| 557 | line |
| 558 | curve |
| 559 | curve |
| 590 | curve |
| 591 | point |
| 592 | point |
| 593 | point |
| 595 | point |
| 596 | point |
| 597 | point |
| 598 | curve |
| 601 | curve |
| 602 | curve |
| 603 | point |
| 604 | point |

What is claimed is:

1. A method of enhancing the tonal and spatial characteristics of a digital image, comprising the steps of:
   a) receiving a source digital image including a plurality of pixels wherein the source digital image is in a luminance-chrominance representation having a luminance digital image channel and at least two chrominance digital image channels;
   b) generating a tone scale function that can be used to enhance the tonal characteristics of the source digital image;
   c) classifying the tone scale function into one of two or more categories wherein the classification categories include expansive and compressive;
   d) using the tone scale function, a spatial filter, and the luminance digital image channel to generate an enhanced luminance digital image channel when the tone scale function has been classified as compressive; and
   e) using the tone scale function and the luminance digital image channel to generate an enhanced luminance digital image channel when the tone scale function has been classified as expansive.

2. The method of claim 1 further including the step of:
   f) amplifying the spatial detail of the enhanced luminance digital image channel produced in step e) in response to the tone scale function to generate a spatially enhanced luminance digital image channel.

3. The method of claim 1 wherein step c) includes using a spatial filter and amplifying the spatial detail of the enhanced luminance digital image channel produced in step e) in response to the tone scale function to generate a spatially enhanced luminance digital image channel.

4. The method of claim 2 wherein the amplifying step includes calculating the slope of the tone scale function and using the calculated slope in generating the spatially enhanced luminance digital image channel.

5. The method of claim 3 wherein the amplifying step includes calculating the slope of the tone scale function and using the calculated slope in generating the spatially enhanced luminance digital image channel.

6. The method of claim 1 wherein step e) further includes modifying the chrominance digital image channels in accordance with the tone scale function.

7. The method of claim 6 wherein the modifying step includes calculating the slope of the tone scale function.

8. The method of claim 2 wherein step e) further includes modifying the chrominance digital image channels in accordance with the tone scale function.

9. The method of claim 8 wherein the modifying step includes calculating the slope of the tone scale function.

10. The method of claim 1 further including the step of:
    g) combining the enhanced luminance digital image channel and the chrominance digital image channels to generate an enhanced digital image when the tone scale function has been classified as compressive, and combining the spatially enhanced luminance digital image channel and the chrominance digital image channels to generate an enhanced digital image when the tone scale function has been classified as expansive.

11. The method of claim 10 using a sigmoid shaped rendering function independent of the source digital image and the enhanced digital image to generate a rendered digital image.

12. The method of claim 1 further including the step of using the pixels of the source digital image to generate the tone scale function.

13. The method of claim 1 further including the step of using the pixels of the source digital image to produce a histogram and using the histogram to generate the tone scale function.

14. The method of claim 13 wherein the tone scale function maps a fixed percentile of the histogram to a predetermined output value and a different fixed percentile of the histogram to a predetermined output value.

15. The method of claim 1 wherein the pixels of the source digital image have a logarithmic relationship to original scene intensities.

16. The method of claim 1 wherein the tone scale function is manually controlled with at least one control parameter.

17. The method of claim 1 further including the steps of:
    h) generating the tone scale function having a highlight tone scale segment and a shadow tone scale segment defined relative to a reference point on the tone scale function, wherein:
       i) the highlight tone scale segment is defined by a different mathematical function than the shadow tone scale segment;
       ii) the highlight tone scale segment is defined for points that are equal to or greater than the reference point; and
       iii) the shadow tone scale segment is defined for points that are equal to or less than the reference point.

18. The method of claim 17 further including the steps of:
    iv) classifying the highlight tone scale segment as either expansive or compressive;
    v) classifying the shadow tone scale segment as either expansive or compressive;
    vi) classifying the tone scale function as compressive when either the highlight or shadow tone scale segment has been classified as compressive and classifying the tone scale function as expansive when both the highlight and shadow tone scale segment have been classified as expansive.

19. The method of claim 17 wherein the slopes of the highlight and shadow tone scale segments are each equal at the reference point.

20. The method of claim 17 wherein the slopes of the highlight and shadow tone scale segments are unequal at the reference point.

21. The method of claim 17 wherein the tone scale function has an inflection point at the reference point.

22. The method of claim 17 wherein the reference point is calculated using the pixels of the source digital image.

23. A method of enhancing the tonal and spatial characteristics of a digital image, comprising the steps of:
 a) receiving a source digital image including a plurality of pixels wherein the source digital image is in a luminance-chrominance representation having a luminance digital image channel and at least two chrominance digital image channels;
 b) generating a tone scale function that can be used to enhance the tonal characteristics of the source digital image;
 c) classifying the tone scale function into one of three categories wherein the classification categories include expansive, compressive, and mixed expansive-compressive;
 d) using the tone scale function, a first spatial filter, and the luminance digital image channel to generate an enhanced luminance digital image channel when the tone scale function has been classified as compressive;
 e) using the tone scale function and the luminance digital image channel to generate an enhanced luminance digital image channel when the tone scale function has been classified as expansive; and
 f) using the tone scale function, the first or another spatial filter, and the luminance digital image channel to generate an enhanced luminance digital image channel when the tone scale function has been classified as mixed expansive-compressive and amplifying the spatial detail of the enhanced luminance digital image channel in response to the tone scale function to generate a spatially enhanced luminance digital image channel.

24. The method of claim 23 wherein the amplifying step includes calculating the slope of the tone scale function and using the calculated slope in generating the spatially enhanced luminance digital image channel.

25. The method of claim 23 wherein step f) further includes modifying the chrominance digital image channels in accordance with the tone scale function.

26. The method of claim 24 wherein the modifying step includes calculating the slope of the tone scale function.

27. The method of claim 22 wherein step e) further includes modifying the chrominance digital image channels in accordance with the tone scale function.

28. The method of claim 27 wherein the modifying step includes calculating the slope of the tone scale function.

29. The method of claim 23 further including the steps of;
 i) combining the enhanced luminance digital image channel and the chrominance digital image channels to generate an enhanced digital image when the tone scale function has been classified as compressive;
 ii) combining the enhanced luminance digital image channel and the chrominance digital image channels to generate an enhanced digital image when the tone scale function has been classified as expansive; and
 iii) combining the spatially enhanced luminance digital image channel and the chrominance digital image channels to generate an enhanced digital image when the tone scale function has been classified as mixed expansive-compressive.

30. The method of claim 29 using a sigmoid shaped rendering function independent of the source digital image and the enhanced digital image to generate a rendered digital image.

31. The method of claim 23 further including the step of using the pixels of the source digital image to generate the tone scale function.

32. The method of claim 23 further including the step of using the pixels of the source digital image to produce a histogram and using the histogram to generate the tone scale function.

33. The method of claim 32 wherein the tone scale function maps a fixed percentile of the histogram to a predetermined output value and a different fixed percentile of the histogram to a predetermined output value.

34. The method of claim 23 wherein the pixels of the source digital image have a logarithmic relationship to original scene intensities.

35. The method of claim 23 wherein the tone scale function is manually controlled with at least one control parameter.

36. The method of claim 23 further including the steps of:
 g) generating the tone scale function having a highlight tone scale segment and a shadow tone scale segment defined relative to a reference point on the tone scale function, wherein:
  i) the highlight tone scale segment is defined by a different mathematical function than the shadow tone scale segment;
  ii) the highlight tone scale segment is defined for points that are equal to or greater than the reference point; and
  iii) the shadow tone scale segment is defined for points that are equal to or less than the reference point.

37. The method of claim 36 further including the steps of:
 iv) classifying the highlight tone scale segment as either expansive or compressive;
 v) classifying the shadow tone scale segment as either expansive or compressive;
 vi) classifying the tone scale function as compressive when both the highlight and shadow tone scale segments have been classified as compressive, classifying the tone scale function as expansive when both the highlight and shadow tone scale segment have been classified as expansive, and classifying the tone scale function as mixed expansive-compressive when only one of the highlight or shadow tone scale segments have been classified as expansive.

38. The method of claim 36 wherein the slopes of the highlight and shadow tone scale segments are each equal at the reference point.

39. The method of claim 36 wherein the slopes of the highlight and shadow tone scale segments are unequal at the reference point.

40. The method of claim 36 wherein the tone scale function has an inflection point at the reference point.

41. The method of claim 36 wherein the reference point is calculated using the pixels of the source digital image.

42. The method of claim 36 further including the step of using the pixels of the source digital image to generate a histogram and using the histogram to generate the highlight tone scale segment.

43. The method of claim 36 wherein the highlight tone scale segment maps a fixed percentile of the histogram to a predetermined output value.

44. The method of claim 36 further including the step of using the pixels of the source digital image to generate a histogram and using the histogram to generate the shadow tone scale segment.

45. The method of claim 43 wherein the shadow tone scale segment maps a fixed percentile of the histogram to a predetermined output value.

46. A computer storage product having at least one computer storage medium having instructions stored therein causing one or more computers to perform the method of claim 1.

47. A computer storage product having at least one computer storage medium having instructions stored therein causing one or more computers to perform the method of claim 23.

* * * * *